(12) United States Patent
Shibao

(10) Patent No.: US 11,898,693 B2
(45) Date of Patent: Feb. 13, 2024

(54) ROTATING MOVABLE BODY FOR WIRE ROPE

(71) Applicant: RIKEN KOGYO Inc., Hokkaido (JP)

(72) Inventor: Yukihiro Shibao, Hokkaido (JP)

(73) Assignee: Riken Kogyo Inc., Hokkaido (JP)

( * ) Notice: Subject to any disclaimer, the term of this patent is extended or adjusted under 35 U.S.C. 154(b) by 442 days.

(21) Appl. No.: 15/734,479

(22) PCT Filed: May 14, 2019

(86) PCT No.: PCT/JP2019/019121
§ 371 (c)(1),
(2) Date: Dec. 2, 2020

(87) PCT Pub. No.: WO2020/075332
PCT Pub. Date: Apr. 16, 2020

(65) Prior Publication Data
US 2021/0270415 A1 Sep. 2, 2021

(30) Foreign Application Priority Data

Oct. 12, 2018 (JP) ................................. 2018-193186

(51) Int. Cl.
| | | |
|---|---|---|
| *G01B 5/20* | (2006.01) | |
| *F16M 13/02* | (2006.01) | |
| *B66B 7/12* | (2006.01) | |

(52) U.S. Cl.
CPC ............. *F16M 13/022* (2013.01); *G01B 5/20* (2013.01); *B66B 7/1215* (2013.01); *B66B 7/1238* (2013.01)

(58) Field of Classification Search
CPC .... G01B 5/20; B66B 7/12; B66B 5/02; B66B 7/1207; B66B 7/1215; B66B 7/1284
See application file for complete search history.

(56) References Cited

U.S. PATENT DOCUMENTS 2,594,143 A * 4/1952 Fichter ..................... G01B 3/48
33/555.2
3,477,136 A * 11/1969 Johnson ................. G01B 5/204
33/555.2
(Continued)

FOREIGN PATENT DOCUMENTS

CN      103357599 A  * 10/2013
CN      107792750 A  *  3/2018    ........... B66B 7/1284
(Continued)

OTHER PUBLICATIONS

Chinese Office Action dated Nov. 10, 2021 from Chinese Patent Application No. 201980037685.8.
(Continued)

*Primary Examiner* — Yaritza Guadalupe-McCall
(74) *Attorney, Agent, or Firm* — Amster, Rothstein & Ebenstein LLP

(57) ABSTRACT

A rotating movable body for a wire rope includes a rotating portion through the interior of which a wire rope passes, the wire rope being formed by twisting together eight strands, and rotary plates provided on the rotating portion so as to engage with parts of the outer shape of the wire rope, wherein the rotary plates are arranged at a predetermined interval in the extension direction of the wire rope, and in a state where each of the plurality of strands is in contact with one of the rotary plates, the rotating portion moves in the extension direction of the wire rope and rotates so as to follow the twist of the strands.

13 Claims, 20 Drawing Sheets

(56) References Cited

U.S. PATENT DOCUMENTS

| | | | | |
|---|---|---|---|---|
| 4,338,565 A | * | 7/1982 | Hall | ............ G01P 13/045 |
| | | | | 73/158 |
| 5,490,333 A | * | 2/1996 | Nelson | ............ G01B 3/40 |
| | | | | 33/501.1 |
| 2009/0044369 A1 | | 2/2009 | Heumann et al. | |
| 2015/0047140 A1 | | 2/2015 | Wright | |

FOREIGN PATENT DOCUMENTS

| | | | | |
|---|---|---|---|---|
| FR | 2045155 A5 | | 2/1971 | |
| JP | S60-6478 Y2 | | 3/1985 | |
| JP | 06198235 A | * | 7/1994 | ........ D07B 7/02 |
| JP | 1994-73071 U | | 10/1994 | |
| JP | H09-12247 A | | 1/1997 | |
| JP | 2009524519 A | | 7/2009 | |
| JP | 2009263101 A | | 11/2009 | |
| JP | 2013-095534 A | | 5/2013 | |
| JP | 2017039559 A | | 2/2017 | |
| JP | 2018034916 A | | 3/2018 | |
| JP | 2018080018 A | | 5/2018 | |
| JP | 2018127724 A | * | 8/2018 | |
| JP | 6462819 B1 | * | 1/2019 | ........ B66B 7/06 |
| KR | 20160040848 A | | 4/2016 | |
| NL | 3834 C | | 10/1919 | |
| RU | 2135404 C1 | | 8/1999 | |
| WO | 2015126358 A1 | | 8/2015 | |

OTHER PUBLICATIONS

International Search Report and Written Opinion dated Jul. 2, 2019 from PCT International Appln. PCT/JP2019/019121 (with English language translation of International Search Report attached).

Extended EP Search Report dated Dec. 23, 2021 from European Patent Application No. 19870338.1.

* cited by examiner (a)

(b)

ROTATING MOVABLE BODY FOR WIRE ROPE

CROSS-REFERENCE TO RELATED APPLICATIONS

This application is a U.S. national stage entry under 35 U.S.C. § 371 of PCT International Patent Application No. PCT/JP2019/019121, filed May 14, 2019, which claims priority to Japanese Patent Application No. 2018-193186, filed Oct. 12, 2018, the contents of each of which are hereby incorporated by reference in their entirety.

TECHNICAL FIELD

This invention relates to a rotating movable body for a wire rope, which is used on a wire rope.

BACKGROUND ART

As shown in FIG. 2 of PTL 1 and FIG. 2 of PTL 2, in a conventional rotating movable body for a wire rope, which is attached to a wire rope, a spiral-shaped portion that follows the shape of the wire rope is formed on an inner peripheral surface of a tubular member. This type of rotating movable body for a wire rope moves while rotating around the wire rope. As a result, the wire rope can be cleaned, and the wire rope can be inspected for deformations such as kinks occurring in the strands of the wire rope.

CITATION LIST

Patent Literature

[PTL 1] Japanese Patent Application Laid-open No. 2011-194386
[PTL 2] Japanese Patent Application Laid-open No. 2013-249153

SUMMARY OF INVENTION

Technical Problem

However, in the rotating movable bodies for a wire rope described in PTL 1 and PTL 2, the spiral-shaped portion that follows the twist of the strands must be formed over the entire inner peripheral surface of the tubular member, making processing laborious and manufacturing costs high. Moreover, when the single tubular member used for the rotating movable body for a wire rope is formed of metal, a problem occurs in that the weight of the rotating movable body for a wire rope increases.

Furthermore, a method of measuring leakage flux from the wire rope using a flaw detector may be employed to inspect the wire rope for deformations, but since a flaw detector is expensive, the cost of the operation to inspect the wire rope increases.

This invention has been designed to solve these problems, and an object thereof is to provide a rotating movable body for a wire rope, with which reductions in processing labor and weight can be achieved and a wire rope inspection operation can be performed at low cost.

Solution to Problem

To solve the problems described above, a rotating movable body for a wire rope according to this invention includes a rotating portion through the interior of which a wire rope passes, the wire rope being formed by twisting together a plurality of strands, and at least two rope engaging portions provided on the rotating portion so as to engage with parts of an outer shape of the wire rope, wherein the at least two rope engaging portions are arranged at a predetermined interval in an extension direction of the wire rope, and in a state where each of the plurality of strands is in contact with one of the at least two rope engaging portions, the rotating portion moves in the extension direction of the wire rope and rotates so as to follow the twist of the strands.

Further, the rope engaging portions of the rotating movable body for a wire rope according to this invention may include rotary plates respectively formed with rope passing holes through which the wire rope passes, at least one rope-engaging recessed portion may be formed in each of the rope passing holes, and the rope-engaging recessed portion may engage with two adjacent strands among the plurality of strands of the wire rope.

Furthermore, two rope-engaging recessed portions may be formed in the rope passing hole in each of the rotary plates.

Furthermore, the rope engaging portions may include rope-engaging projecting portions that project inwardly from the rotating portion, and each of the rope-engaging projecting portions may engage with a groove between two adjacent strands among the plurality of strands of the wire rope.

Moreover, a strand contacting portion that comes into contact with the strands of the wire rope by surface contact may be provided on the inside of the rotating portion.

Furthermore, a needle sensor that comes into contact with the strands of the wire rope and detects variation in a surface shape of the wire rope may be provided on the rotating portion.

Moreover, the rotating portion may include at least two tubular case portions that are arranged in the extension direction of the wire rope and capable of rotating relative to each other, and the rope engaging portions may be provided on the insides of the respective case portions.

Furthermore, the rope engaging portions may be formed of elastic bodies.

Advantageous Effects of Invention

With the rotating movable body for a wire rope according to this invention, reductions in processing labor and weight can be achieved, and a wire rope inspection operation can be performed at low cost.

DESCRIPTION OF EMBODIMENTS

Embodiments of this invention will be described below on the basis of the attached figures.

First Embodiment

Figure 1:
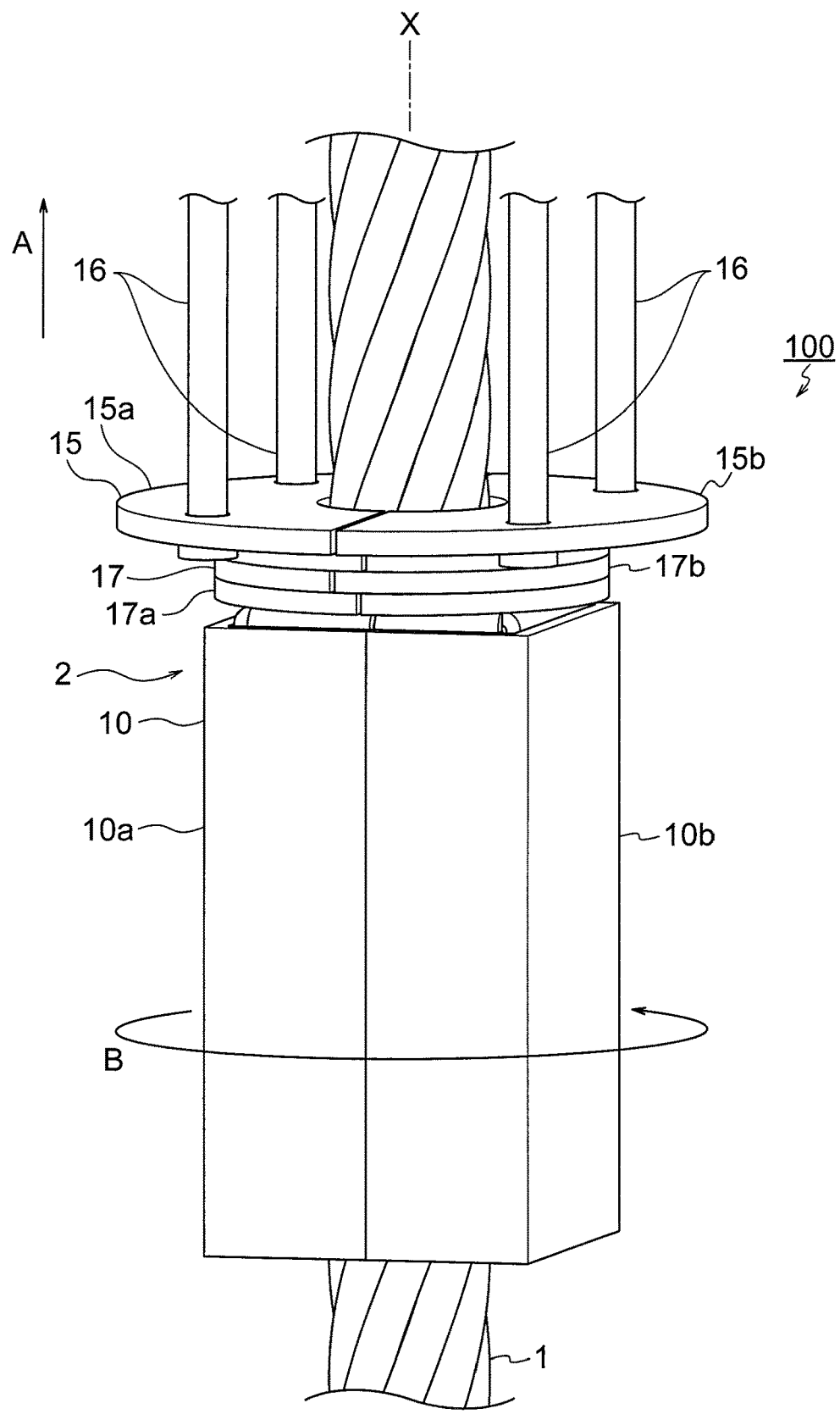
FIG. 1 is a perspective view of a rotating movable body for a wire rope according to a first embodiment of this invention.

As shown in FIG. 1, a rotating movable body 100 for a wire rope, which is attached to a wire rope 1, includes a rotating portion 2 through the interior of which the wire rope 1 passes, a connecting portion 15 attached to an upper end of the rotating portion 2, and four rod-shaped pulled portions 16 that are coupled to the rotating portion 2 via the connecting portion 15. The rotating portion 2 is capable of rotating about the wire rope 1. Note that the rotational center of the rotating portion 2 is set as a rotary axis X.

The rotating portion 2 includes a substantially rectangular parallelepiped-shaped tubular case portion 10. The wire rope 1 passes through the interior of the case portion 10 of the rotating portion 2. The case portion 10 of the rotating portion 2 is divided into two parts, namely a first case portion 10a and a second case portion 10b, along the direction of the rotary axis X.

Figure 2:
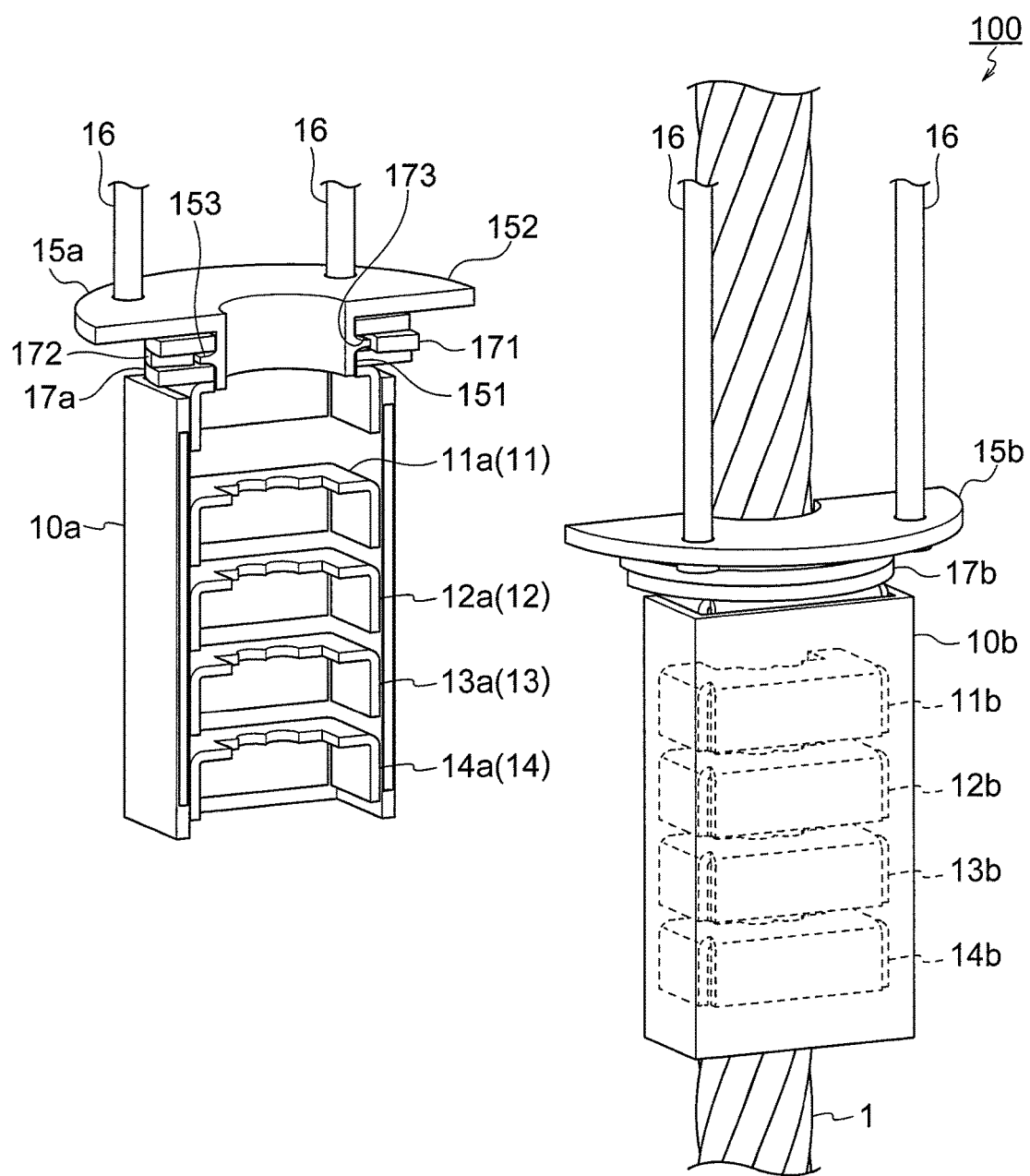
FIG. 2 is an exploded perspective view of the rotating movable body for a wire rope shown in FIG. 1.

Further, as shown in FIG. 2, four rotary plates 11, 12, 13, 14 are provided in the interior of the case portion 10 of the rotating portion 2 in the extension direction of the wire rope 1. The four rotary plates 11, 12, 13, 14 are fixed to the inside of the case portion 10 of the rotating portion 2 so as to rotate integrally with the case portion 10. Note that each of the rotary plates 11, 12, 13, 14 is similarly divided into two parts in the direction of the rotary axis X of the rotating portion 2. First rotary plates 11a, 12a, 13a, 14a constituting one of the two divided parts of the respective rotary plates 11, 12, 13, 14 are fixed to the inside of the first case portion 10a, and second rotary plates 11b, 12b, 13b, 14b respectively constituting the other part are fixed to the inside of the second case portion 10b.

Note that the rotary plates 11, 12, 13, 14 constitute rope engaging portions. Further, the rotary plates 11, 12, 13, 14 are formed of elastic bodies made of a steel material, carbon fiber, resin, or the like.

Furthermore, an attachment portion 17 attached to the upper end of the case portion 10 is divided into a first attachment portion 17a and a second attachment portion 17b in the direction of the rotary axis X of the rotating portion 2. The first attachment portion 17a is fixed to the upper end of the first case portion 10a, and the second attachment portion 17b is fixed to the upper end of the second case portion 10b. As shown in FIG. 2, a convex portion 171 is formed on one end surface of the first attachment portion 17a, which is curved into a semicircular shape, and a concave portion 172 is formed in the other end surface. Further, similarly, a convex portion (not shown) having a similar shape to the convex portion 171 is formed on one end surface of the second attachment portion 17b, which is curved into a semicircular shape, and a concave portion (not shown) having a similar shape to the concave portion 172 is formed in the other end surface. By fitting the convex portion 171 of the first attachment portion 17a into the concave portion of the second attachment portion 17b and fitting the convex portion of the second attachment portion 17b into the concave portion 172 of the first attachment portion 17a, the first attachment portion 17a and the second attachment portion 17b are joined to each other so as to form the single attachment portion 17. Moreover, a substantially annular engagement groove 173 is formed in an inner peripheral surface of the attachment portion 17.

Furthermore, as shown in FIGS. 1 and 2, the connecting portion 15 is attached to the attachment portion 17. As shown in FIG. 2, the connecting portion 15 includes a cylindrical portion 151 and a flange portion 152 provided on an upper end of the cylindrical portion 151. Further, a substantially annular projecting engagement portion 153 is formed on an outer peripheral surface of the cylindrical portion 151. The cylindrical portion 151 of the connecting portion 15 is fitted to the inside of the attachment portion 17, and the projecting engagement portion 153 on the cylindrical portion 151 of the connecting portion 15 is fitted into the engagement groove 173 in the attachment portion 17. Note that a bearing or a clamp (not shown) is provided between the attachment portion 17 and the connecting portion 15. The connecting portion 15 is thus attached to the attachment portion 17 so as to be capable of rotating relative thereto. Moreover, the connecting portion 15 is divided into a first connecting portion 15a and a second connecting portion 15b in the direction of the rotary axis X of the rotating portion 2. End portions of two of the pulled portions 16 are attached to each of the respective flange portions 152 of the first connecting portion 15a and the second connecting portion 15b.

Next, referring to FIGS. 3 to 5, the structure of the rotary plates 11, 12, 13, 14 will be described in detail.

Figure 3:
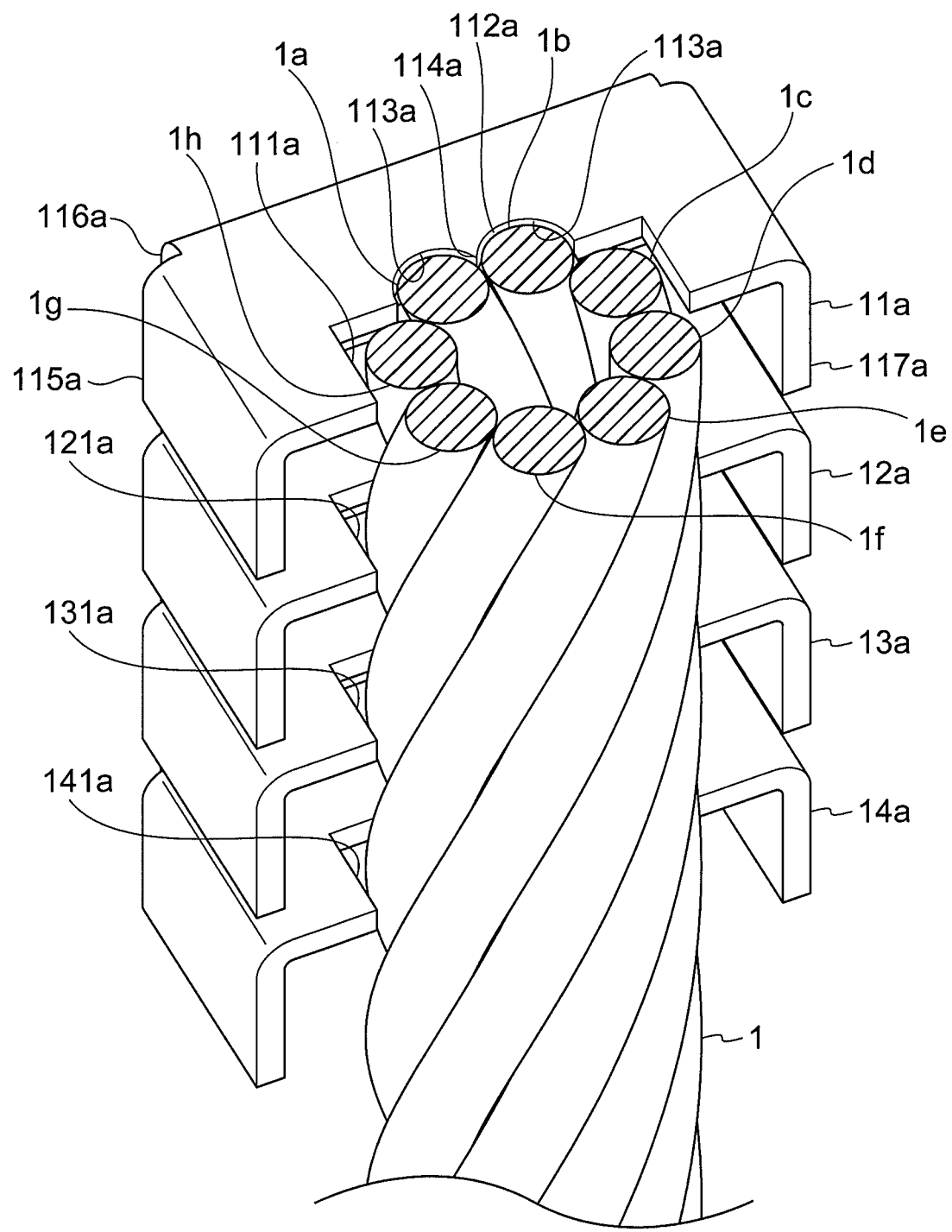
FIG. 3 is a schematic perspective view showing a relationship between a wire rope and rotary plates of the rotating movable body for a wire rope shown in FIG. 1.
Figure 4:
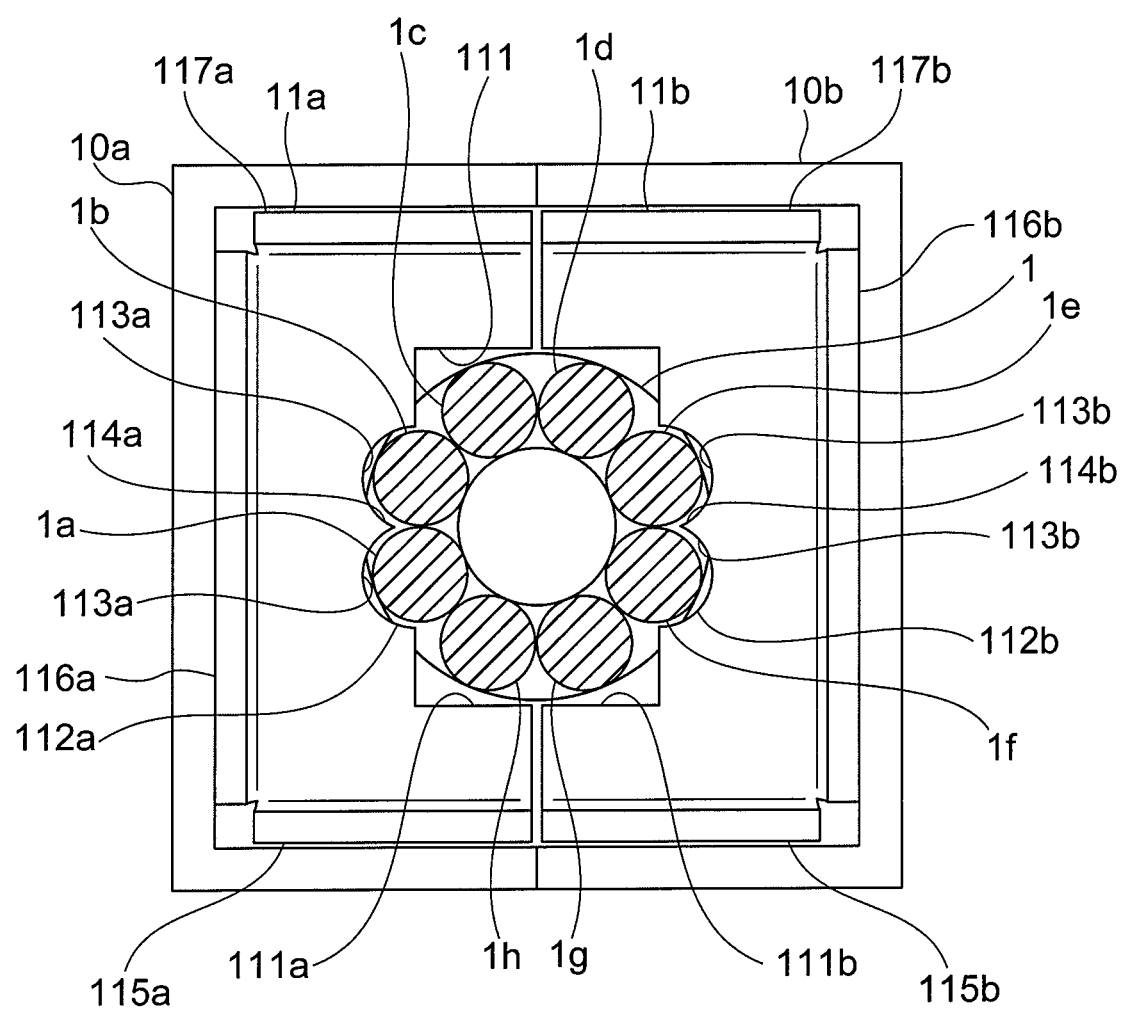
FIG. 4 is a schematic plan view showing the relationship between the wire rope and a rotary plate of the rotating movable body for a wire rope shown in FIG. 1.
Figure 5:
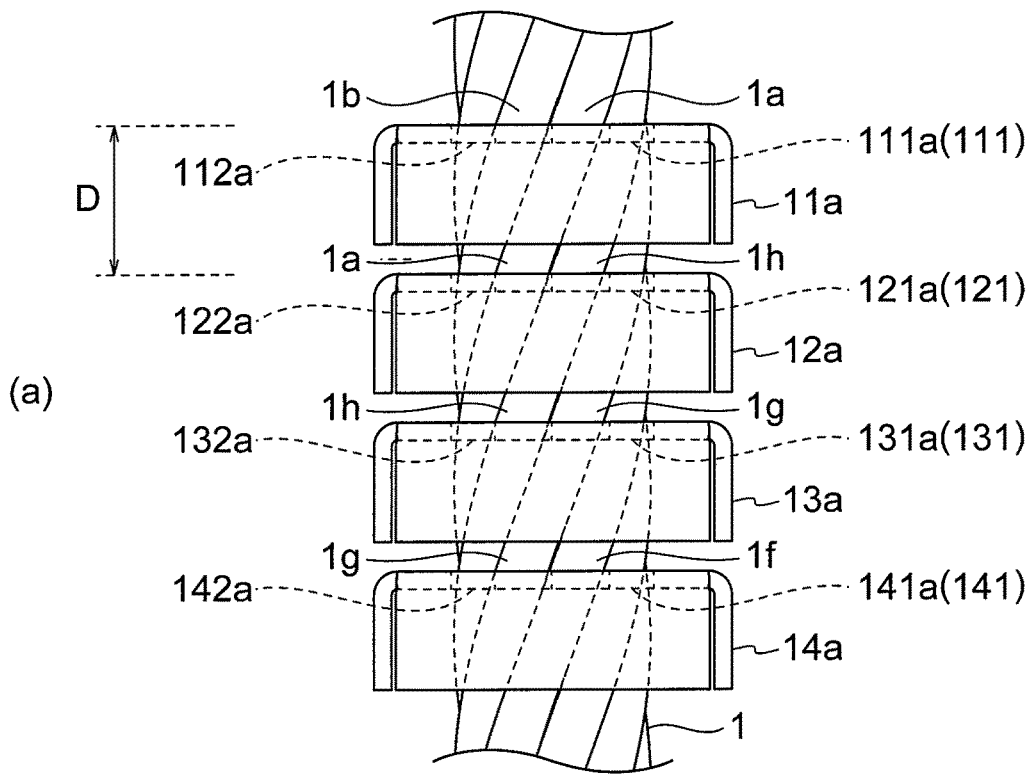
FIG. 5(*a*) is a schematic side view showing a relationship between the wire rope and first rotary plates of the rotating movable body for a wire rope shown in FIG. 1, and FIG. 5(*b*) is a schematic side view showing a relationship between the wire rope and second rotary plates of the rotating movable body for a wire rope shown in FIG. 1.
Figure 5:
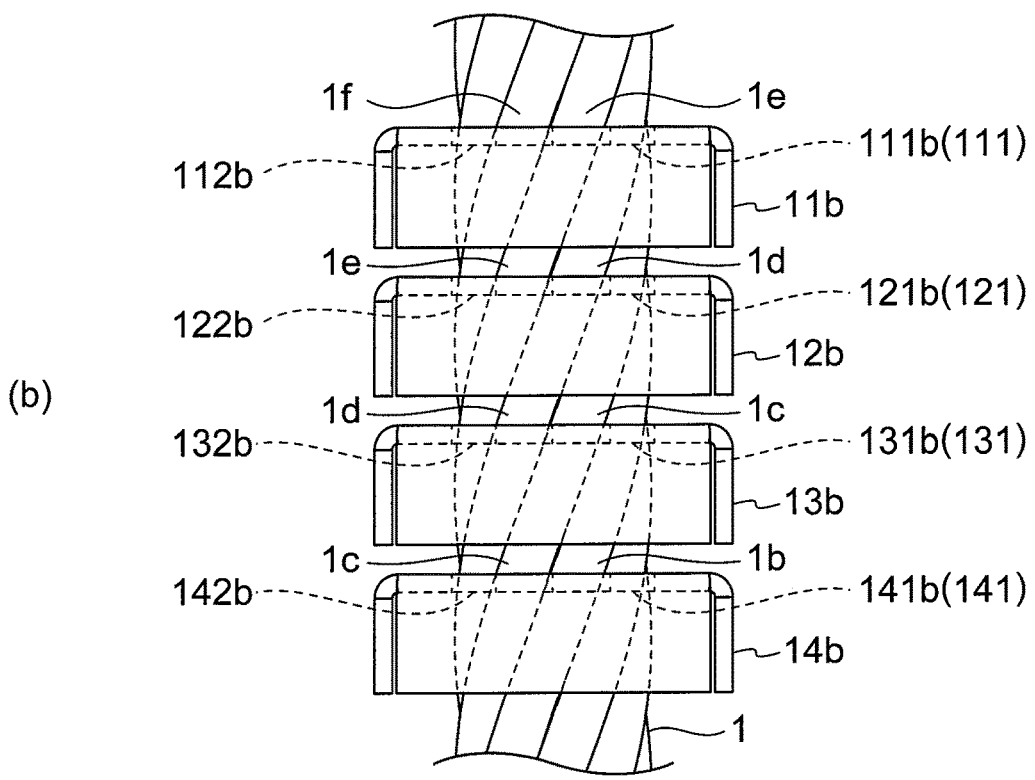

As shown in FIGS. 3 and 4, the wire rope 1 is formed by twisting together eight strands 1a, 1b, 1c, 1d, 1e, 1f, 1g, 1h. Here, a cutout 111a is formed in one side of the first rotary plate 11a of the rotary plate 11. Further, a rope-engaging recessed portion 112a capable of engaging with the strands 1a, 1b of the wire rope 1 is formed in the cutout 111a of the first rotary plate 11a. As shown in FIG. 4, the rope-engaging recessed portion 112a includes two semicircular portions 113a that correspond to respective outer shapes of the strands 1a, 1b of the wire rope 1. Further, a projecting part 114a formed between the two semicircular portions 113a engages with a groove between the strands 1a, 1b of the wire rope 1.

Similarly, as shown in FIG. 4, a cutout 111b is formed in one side of the second rotary plate 11b. Further, a rope-engaging recessed portion 112b capable of engaging with the strands 1e, 1f of the wire rope 1 is formed in the cutout 111b of the second rotary plate 11b. The rope-engaging recessed portion 112b includes two semicircular portions 113b that correspond to respective outer shapes of the strands 1e, 1f of the wire rope 1. Further, a projecting part 114b formed between the two semicircular portions 113b engages with a groove between the strands 1e, 1f of the wire rope 1.

Note that when the first rotary plate 11a and the second rotary plate 11b are joined together, the cutout 111a in the first rotary plate 11a and the cutout 111b in the second rotary plate 11b form a rope passing hole 111 in the single rotary plate 11.

As shown in FIGS. 3 and 4, bent portions 115a, 116a, 117a that are bent downward are provided on the three sides of the first rotary plate 11a other than the side provided with the cutout 111a. Similarly, bent portions 115b, 116b, 117b that are bent downward are provided on the three sides of the second rotary plate 11b other than the side provided with the cutout 111b. Accordingly, the downward-bent bent portions 115a, 115b, 116a, 116b, 117a, 117b are provided on the four sides of the rotary plate 11.

Further, the first rotary plates 12a, 13a, 14a and the second rotary plates 12b, 13b, 14b of the rotary plates 12, 13, 14 disposed on the lower side of the rotary plate 11 have similar structures to the first rotary plate 11a and the second rotary plate 11b of the rotary plate 11.

More specifically, as shown in FIG. 5(a), cutouts 121a, 131a, 141a are formed in the first rotary plates 12a, 13a, 14a of the rotary plates 12, 13, 14. Further, rope-engaging recessed portions 122a, 132a, 142a are provided in the cutouts 121a, 131a, 141a. Here, as described above, the rope-engaging recessed portion 112a of the first rotary plate 11a engages with the outer shapes of the strands 1a, 1b of the wire rope 1 and the groove between the strands 1a, 1b.

Similarly, the rope-engaging recessed portion 122a of the first rotary plate 12a engages with the outer shapes of the strands 1h, 1a of the wire rope 1 and the groove between the strands 1h, 1a. The rope-engaging recessed portion 132a of the first rotary plate 13a engages with the outer shapes of the strands 1g, 1h of the wire rope 1 and the groove between the strands 1g, 1h. The rope-engaging recessed portion 142a of the first rotary plate 14a engages with the outer shapes of the strands 1f, 1g of the wire rope 1 and the groove between the strands 1f, 1g.

Furthermore, as shown in FIG. 5(b), cutouts 121b, 131b, 141b are formed in the second rotary plates 12b, 13b, 14b. Further, rope-engaging recessed portions 122b, 132b, 142b are provided in the cutouts 121b, 131b, 141b. The rope-engaging recessed portion 112b of the second rotary plate 11b engages with the outer shapes of the strands 1e, 1f of the wire rope 1 and the groove between the strands 1e, 1f. Further, similarly, the rope-engaging recessed portion 122b of the second rotary plate 12b engages with the outer shapes of the strands 1d, 1e of the wire rope 1 and the groove between the strands 1d, 1e. The rope-engaging recessed portion 132b of the second rotary plate 13b engages with the outer shapes of the strands 1c, 1d of the wire rope 1 and the groove between the strands 1c, 1d. The rope-engaging recessed portion 142b of the second rotary plate 14b engages with the outer shapes of the strands 1b, 1c of the wire rope 1 and the groove between the strands 1b, 1c.

Note that the cutouts 121a, 131a, 141a in the first rotary plates 12a, 13a, 14a and the cutouts 121b, 131b, 141b in the second rotary plates 12b, 13b, 14b respectively constitute rope passing holes 121, 131, 141 in the rotary plates 12, 13, 14.

Furthermore, similarly to the rotary plate 11, bent portions that are bent downward are provided on the four sides of each of the rotary plates 12, 13, 14 constituted by the first rotary plates 12a, 13a, 14a and the second rotary plates 12b, 13b, 14b.

As shown in FIGS. 5(a) and 5(b), an interval D between adjacent rotary plates 11, 12, 13, 14 is equal to the pitch of one strand. More specifically, when the pitch of the wire rope 1 including the eight strands 1a to 1h is 100 mm, the pitch of a single strand is 100/8=12.5 mm. Accordingly, the interval D between the rotary plates 11, 12, 13, 14 is also set at 12.5 mm. Thus, any one of the rope-engaging recessed portions 112a, 112b, 122a, 122b, 132a, 132b, 142a, 142b of the rotary plates 11, 12, 13, 14 can be engaged with all of the grooves formed between the eight strands 1a to 1h.

Next, referring to FIGS. 1 and 2, an operation of the rotating movable body 100 for a wire rope will be described.

First, when attaching the rotating movable body 100 for a wire rope to the wire rope 1, as shown in FIG. 2, the rotating movable body 100 for a wire rope is divided into two parts in the direction of the rotary axis X and then joined together so as to sandwich the wire rope 1.

Then, when the rotating movable body 100 for a wire rope is operated, as shown in FIG. 1, the pulled portions 16 are pulled upward by a motor (not shown) provided above the wire rope 1. Accordingly, the rotating portion 2 moves in the extension direction of the wire rope 1 while the pulled portions 16 are pulled, as indicated by an arrow A, and the rotating portion 2 rotates around the wire rope 1 so as to follow the twist of the strands 1a to 1h, as indicated by an arrow B. If a deformation such as a kink has occurred in the wire rope 1, one of the rotary plates 11, 12, 13, 14 of the rotating portion 2 catches on the irregularity in the deformed location such that the rotating movable body 100 for a wire rope becomes unable to move smoothly. As a result, a deformation caused by a kink in the wire rope 1, compression or swelling thereof, depression or raveling of the strands 1a to 1h, and so on can be discovered easily.

Hence, in the rotating movable body 100 for a wire rope according to the first embodiment, the four rotary plates 11, 12, 13, 14 are arranged at the predetermined interval D in the extension direction of the wire rope 1. Further, the rope-engaging recessed portions 112a, 112b, 122a, 122b, 132a, 132b, 142a, 142b formed in the four rotary plates 11, 12, 13, 14 each engage with a part of the outer shape of the wire rope 1. Hence, the rotating movable body 100 for a wire rope can be manufactured by processing the rotary plates 11, 12, 13, 14 serving as the rope engaging portions one at a time in alignment with parts of the outer shape of the wire rope 1. As a result, the rotating movable body 100 for a wire rope can be manufactured more easily than when a spiral-shaped irregularity that follows the twist of the strands 1a to 1h of the wire rope 1 is formed on the inner peripheral surface of a single tubular member. Moreover, the amount of processing labor is reduced, and therefore the manufacturing cost of the rotating movable body 100 for a wire rope can be suppressed. Furthermore, the rope engaging portions are constituted by the four thin rotary plates 11, 12, 13, 14, and therefore the weight of the rotating movable body 100 for a wire rope can be reduced. In addition, by using the rotating movable body 100 for a wire rope, the cost of an operation to inspect the wire rope 1 for deformations can be suppressed in comparison with a conventional flaw detector that inspects the wire rope 1 using leakage flux.

Further, in a state where each of the eight strands 1a to 1h of the wire rope 1 is in contact with one of the rope-engaging recessed portions 112a, 112b, 122a, 122b, 132a, 132b, 142a, 142b, the rotary plates 11, 12, 13, 14 of the rotating movable body 100 for a wire rope each perform a rotating motion so as to follow the twist of the strands 1a to 1h. Therefore, when an irregularity caused by a kink or the like exists in one of the strands 1a to 1h of the wire rope 1, one of the rotary plates 11, 12, 13, 14 catches on the irregularity, and as a result, deformations of the wire rope 1 can be detected immediately.

Furthermore, the rope-engaging recessed portions 112a, 112b, 122a, 122b, 132a, 132b, 142a, 142b engage with two adjacent strands among the eight strands 1a to 1h of the wire rope 1. As a result, the rotary plates 11, 12, 13, 14 can engage with the wire rope 1 more reliably.

Moreover, two rope-engaging recessed portions are formed in each of the rotary plates 11, 12, 13, 14 constituted by the first rotary plates 11a, 12a, 13a, 14a and the second rotary plates 11b, 12b, 13b, 14b. Hence, in relation to the eight strands 1a to 1h, the number of rotary plates 11, 12, 13, 14 serving as the rope engaging portions can be set at four, i.e. half the number of strands. As a result, the number of components of the rotating movable body 100 for a wire rope and the size and weight of the rotating movable body 100 for a wire rope can be reduced.

Further, by forming the rotary plates 11, 12, 13, 14 from elastic bodies made of a steel material, carbon fiber, resin, or the like, the rotary plates 11, 12, 13, 14 can be processed more easily.

Second Embodiment

Figure 6:
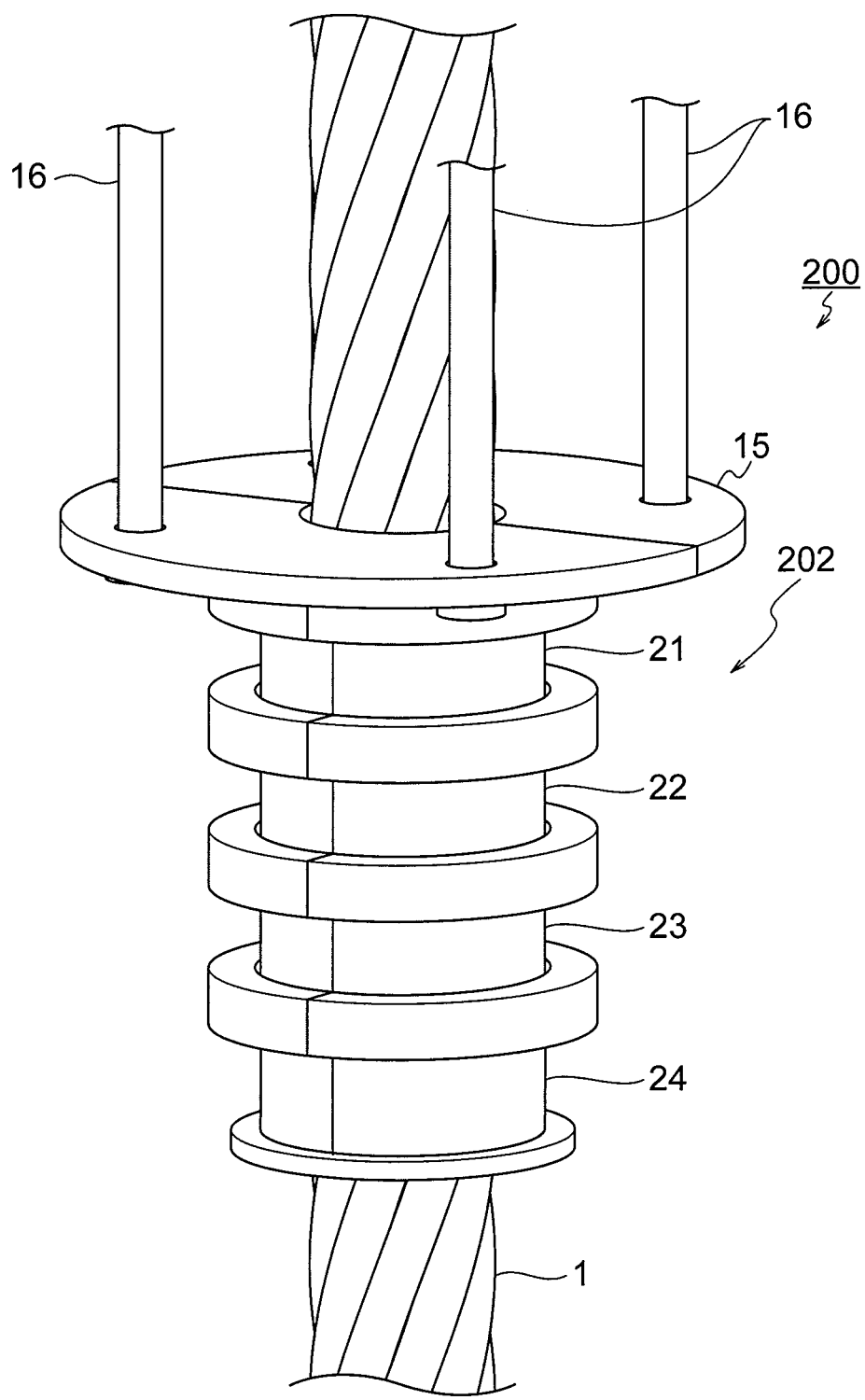
FIG. 6 is a perspective view of a rotating movable body for a wire rope according to a second embodiment of this invention.
Figure 7:
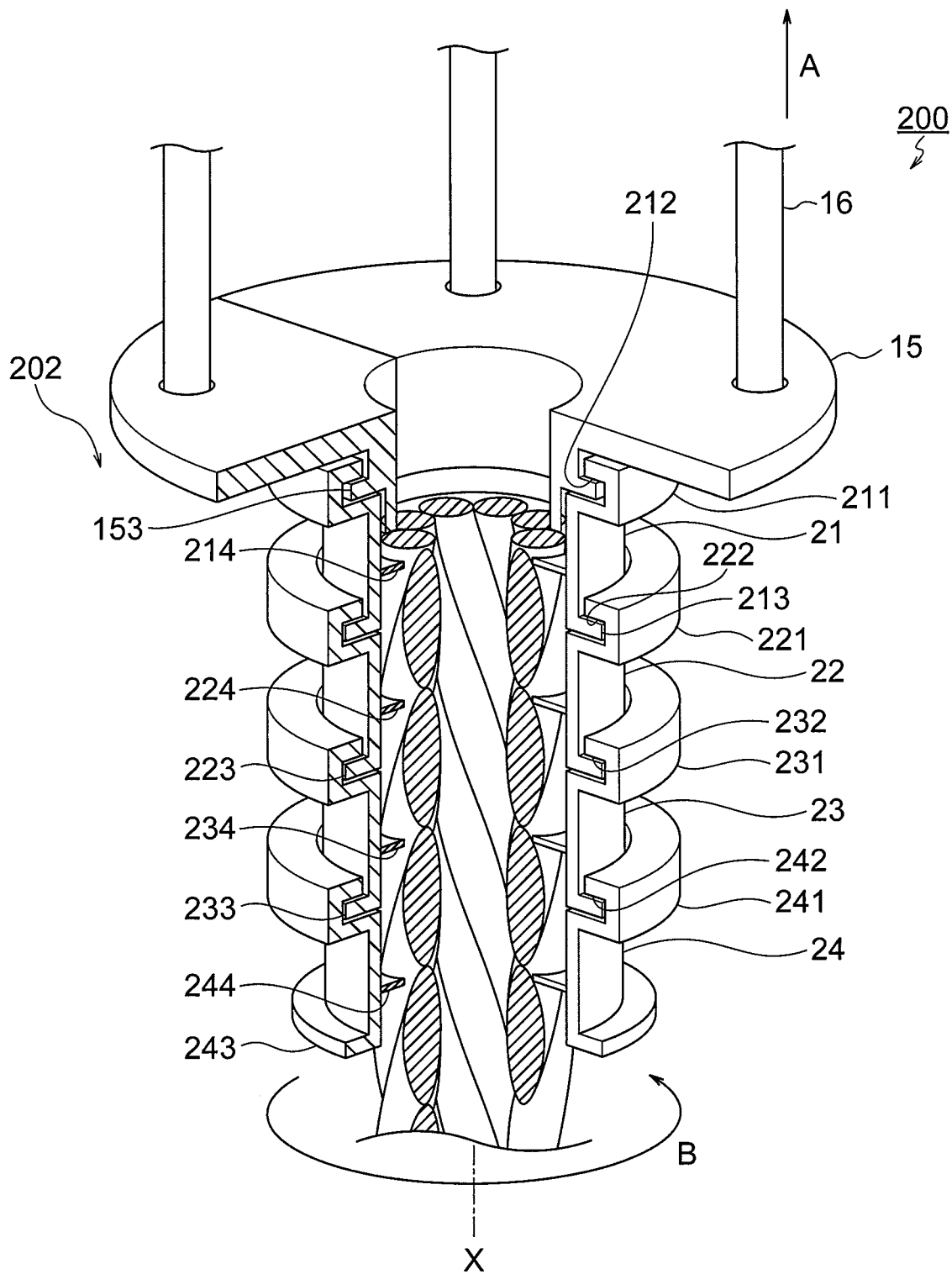
FIG. 7 is a partially cut-away perspective sectional view showing an internal structure of the rotating movable body for a wire rope shown in FIG. 6.
Figure 8:
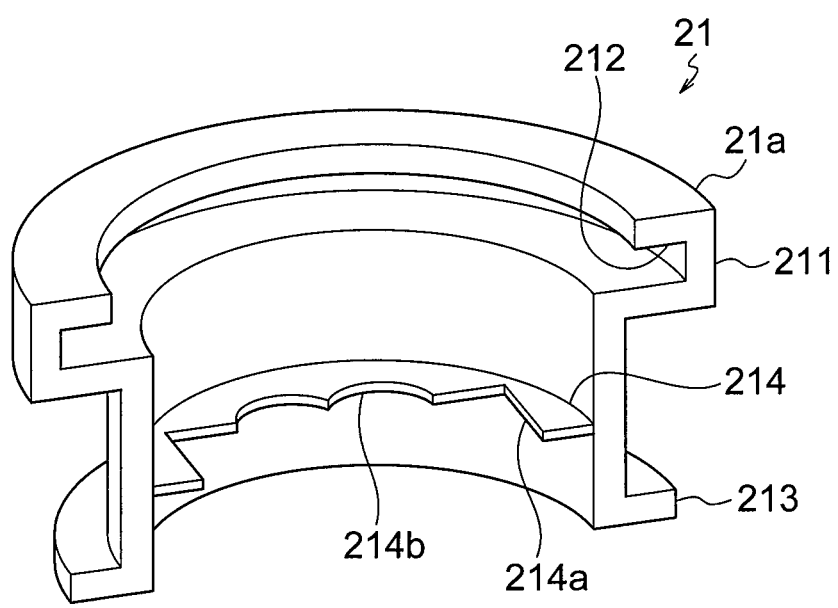
FIG. 8 is a perspective view showing a structure inside a first case portion forming a case portion of the rotating movable body for a wire rope shown in FIG. 6.
Figure 9:
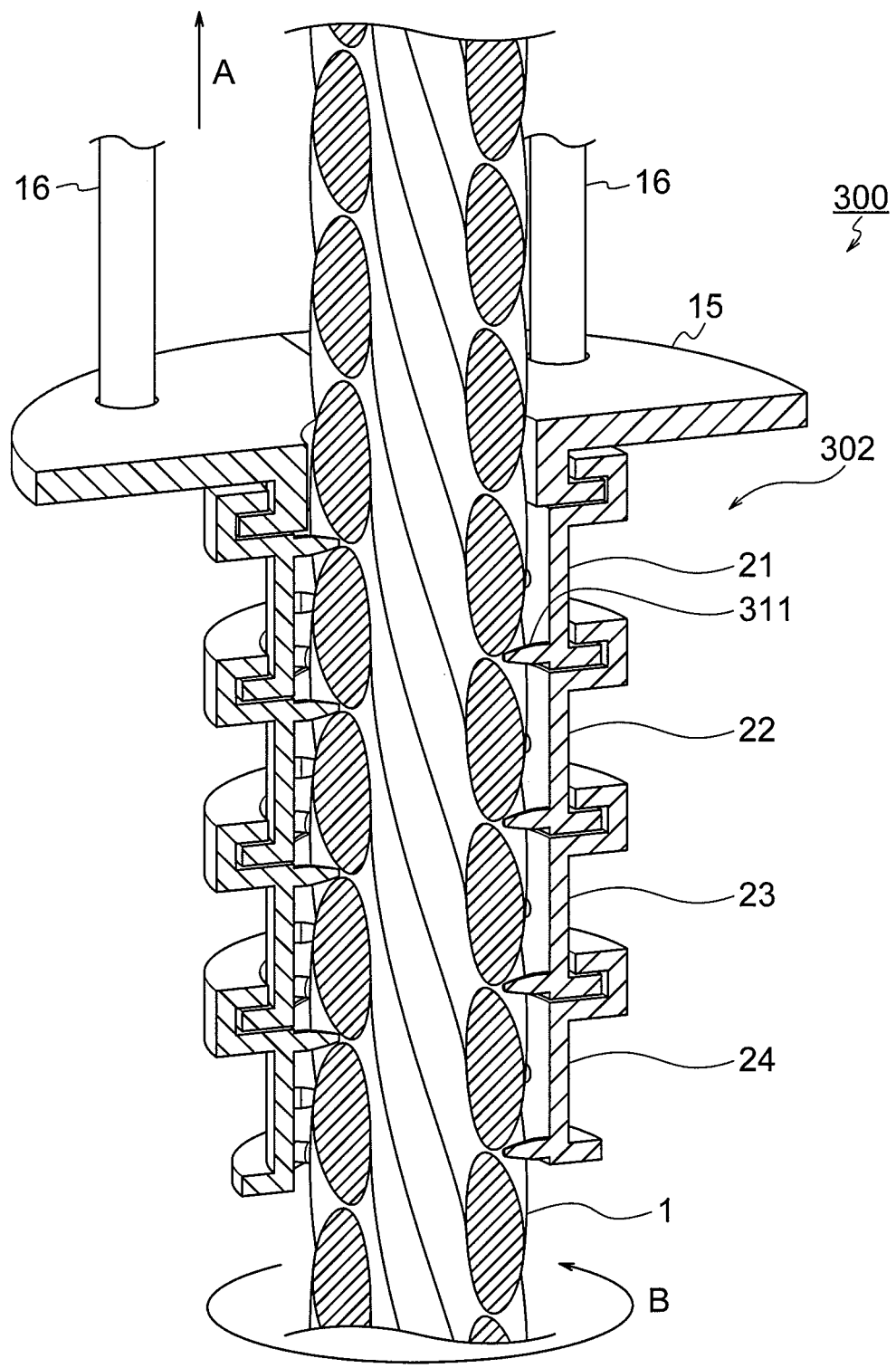
FIG. 9 is a perspective sectional view showing an internal structure of a rotating movable body for a wire rope according to a third embodiment of this invention.

FIGS. 6 to 8 show a configuration of a rotating movable body 200 for a wire rope according to a second embodiment of this invention. Note that identical symbols to the reference symbols in FIGS. 1 to 5 denote identical or similar constituent elements, and therefore detailed description thereof has been omitted.

As shown in FIG. 6, the rotating movable body 200 for a wire rope includes a rotating portion 202 through the interior of which the wire rope 1 passes. The rotating portion 202 includes four substantially cylindrical case portions 21, 22, 23, 24 in the extension direction of the wire rope 1.

As shown in FIG. 7, a substantially annular band-shaped convex portion 211 is formed on an outer periphery of an upper end of the case portion 21. Further, a groove portion 212 is formed on an inner peripheral side of the convex portion 211. Furthermore, a flange portion 213 is formed on an outer periphery of a lower end of the case portion 21.

Note that the case portions 22, 23, 24 disposed on the lower side of the case portion 21 have a similar structure to the case portion 21. More specifically, the case portions 22, 23, 24 respectively include convex portions 221, 231, 241, groove portions 222, 232, 242, and flange portions 223, 233, 243 having similar shapes to the convex portion 211, the groove portion 212, and the flange portion 213.

The projecting engagement portion 153 of the connecting portion 15 engages with the groove portion 212 in the case portion 21. Further, the flange portion 213 of the case portion 21 engages with the groove portion 222 in the case portion 22. Further, the flange portion 223 of the case portion 22 engages with the groove portion 232 in the case portion 23. Further, the flange portion 233 of the case portion 23 engages with the groove portion 242 in the case portion 24. The case portions 21, 22, 23, 24 are capable of rotating relative to each other.

Note that bearings or clamps, not shown in the figures, are provided in the respective coupling parts between the connecting portion 15 and the case portions 21, 22, 23, 24.

Furthermore, the case portions 21, 22, 23, 24 are each divided into two parts in the direction of the rotary axis X. As shown in FIG. 8, for example, a first case portion 21a serving as one part of the case portion 21 divided into two parts includes a rotary plate 214 on the inside thereof. A cutout 214a constituting a rope passing hole through which the wire rope 1 passes is formed in the rotary plate 214. Further, two rope-engaging recessed portions 214b that engage with two adjacent strands, among the eight strands 1a to 1h of the wire rope 1, and the groove between the strands are formed in the cutout 214a.

Note that the other part of the case portion 21 divided into two parts has a similar shape to the first case portion 21a. More specifically, two rope-engaging recessed portions 214b are formed in the rotary plate 214 provided in the interior of the case portion 21.

Furthermore, the case portions 22, 23, 24 disposed on the lower side of the case portion 21 include rotary plates 224, 234, 244 having a similar shape to the rotary plate 214 provided on the inside of the case portion 21. Similarly to the rotary plate 214 of the case portion 21, each of the rotary plates 224, 234, 244 is formed with the cutout 214a and the rope-engaging recessed portions 214b that engage with two adjacent strands and the groove between the strands.

Note that the rotary plates 214, 224, 234, 244 respectively constitute rope engaging portions that engage with parts of the outer shape of the wire rope 1. Further, the rotary plates 214, 224, 234, 244 are arranged at predetermined intervals in the extension direction of the wire rope 1.

Next, referring to FIG. 7, an operation of the rotating movable body 200 for a wire rope will be described.

First, when attaching the rotating movable body 200 for a wire rope to the wire rope 1, the connecting portion 15 which is divided into two parts and case portions 21, 22, 23, 24 are joined together so as to sandwich the wire rope 1. At this time, the case portions 21, 22, 23, 24 are disposed so that the rope-engaging recessed portions 214b formed in the rotary plates 214, 224, 234, 244 engage with all of the grooves provided between the strands 1a to 1h. Thus, each of the strands 1a to 1h is in contact with one of the rope-engaging recessed portions 214b of the rotary plates 214, 224, 234, 244.

Then, when the rotating movable body 200 for a wire rope is operated, the pulled portions 16 are pulled upward by a motor (not shown). Accordingly, the case portions 21, 22, 23, 24 of the rotating portion 202 move in the extension direction of the wire rope 1 while the pulled portions 16 are pulled, as indicated by the arrow A, and the case portions 21, 22, 23, 24 rotate around the wire rope 1 so as to follow the twist of the strands 1a to 1h, as indicated by the arrow B. If a deformation has occurred in the wire rope 1, one of the rotary plates 214, 224, 234, 244 provided in the case portions 21, 22, 23, 24 catches on the deformed location of the wire rope 1. As a result, a deformation such as a kink in the wire rope 1 can be discovered easily.

Hence, in the rotating movable body 200 for a wire rope according to the second embodiment, similarly to the rotating movable body 100 for a wire rope, the rotary plates 214, 224, 234, 244 serving as the rope engaging portions are processed one at a time in alignment with parts of the outer shape of the wire rope 1. Accordingly, the rotating movable body 200 for a wire rope, which is capable of performing a rotating motion around the wire rope 1, can be manufactured easily, enabling a reduction in the amount of processing labor, and as a result, the manufacturing cost of the rotating movable body 200 for a wire rope can be suppressed. Furthermore, the weight of the rotating movable body 200 for a wire rope can be reduced. Moreover, deformations in the wire rope 1 can be detected easily and at low cost.

In addition, the rotating portion 202 of the rotating movable body 200 for a wire rope includes the four case portions 21, 22, 23, 24 that extend along the extension direction of the wire rope 1 and are capable of rotating independently of and relative to each other. As a result, the rotating movable body 200 for a wire rope can be moved along the wire rope 1 without being affected by slight differences in the pitch of the wire rope 1 due to manufacturer differences and lot differences as well as aging of the pitch due to long-term differences in specifications.

Furthermore, when deformations such as kinks, diameter reduction and pitch elongation, and so on occur in the wire rope 1 with age, the positions of the case portions 21, 22, 23, 24 forming the rotating portion 202 of the rotating movable body 200 for a wire rope may deviate from each other, and the case portions 21, 22, 23, 24 may tilt so that the angles thereof change. Therefore, by marking the relative positions of the case portions 21, 22, 23, 24 when attaching the rotating movable body 200 for a wire rope to a newly installed wire rope 1, subsequent positional deviation and tilting of the case portions 21, 22, 23, 24 can be spotted easily. As a result, elongation and deformation of the wire rope 1 can easily be confirmed from the degree to which the relative positions and angles of the case portions 21, 22, 23, 24 have deviated from the original positions, and the confirmed elongation and deformation can be used as a guideline to the usage limit of the wire rope 1.

Third Embodiment

FIGS. 9 to 12 show a configuration of a rotating movable body 300 for a wire rope according to a third embodiment of this invention. Note that identical symbols to the reference symbols in FIGS. 1 to 8 denote identical or similar constituent elements, and therefore detailed description thereof has been omitted.

As shown in FIGS. 9 to 12, a rotating portion 302 of the rotating movable body 300 for a wire rope includes the substantially cylindrical case portions 21, 22, 23, 24, which are arranged in the extension direction of the wire rope 1 and capable of rotating relative to each other. A plurality of rope-engaging projecting portions 311 are provided on the inner peripheral surfaces of the case portions 21, 22, 23, 24. The rope-engaging projecting portions 311 engage with the grooves between any pair of adjacent strands among the eight strands 1a to 1h of the wire rope 1.

Note that the rope-engaging projecting portions 311 constitute rope engaging portions.

Figure 10:
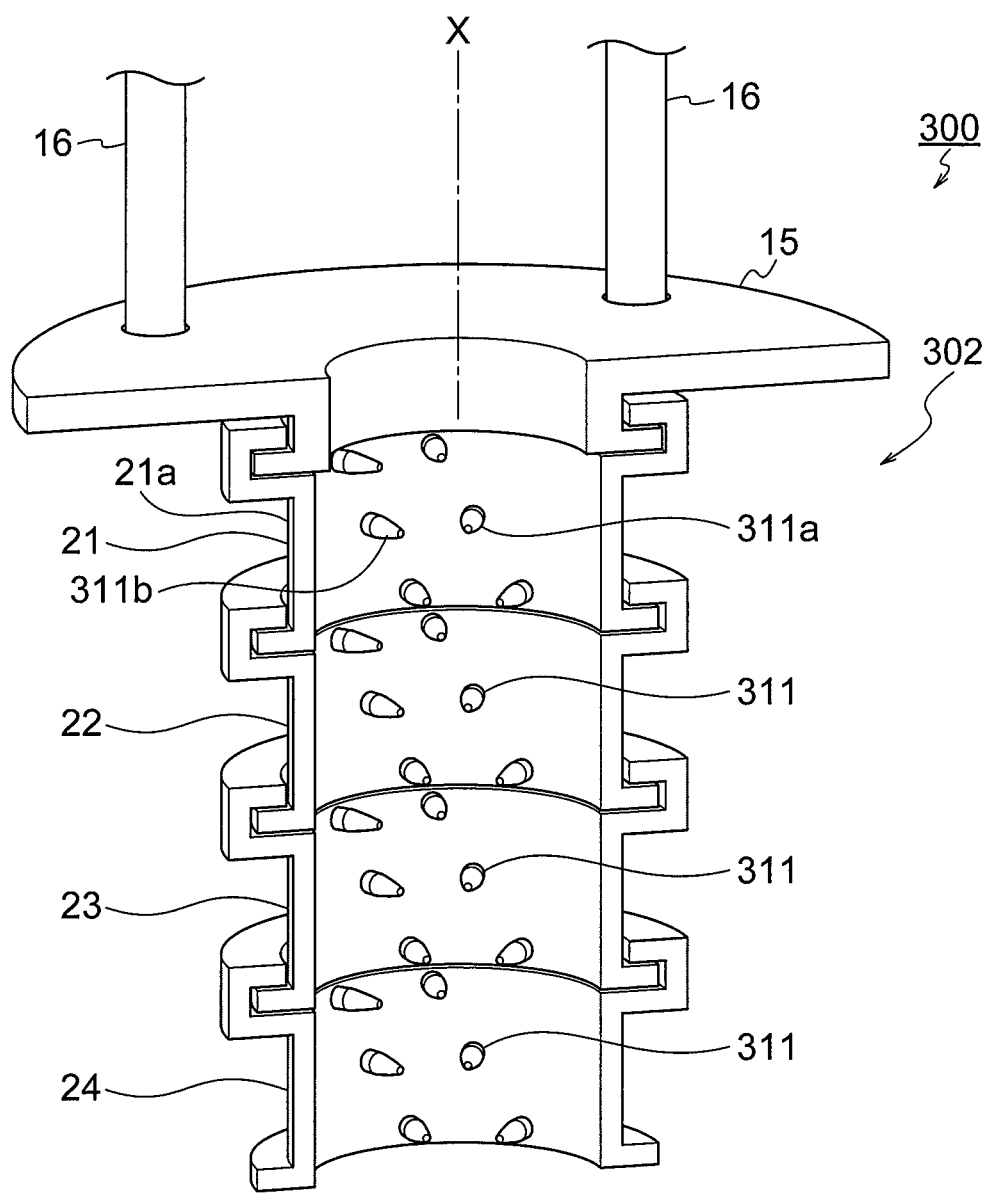
FIG. 10 is a perspective view showing an internal structure of the rotating movable body for a wire rope shown in FIG. 9.
Figure 11:
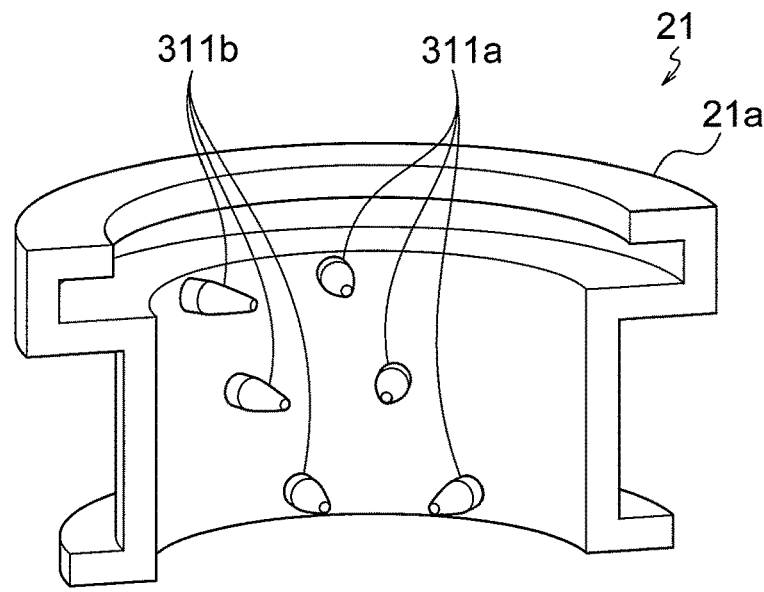
FIG. 11 is a perspective view showing a structure inside a first case portion forming a case portion of the rotating movable body for a wire rope shown in FIG. 9.
Figure 12:
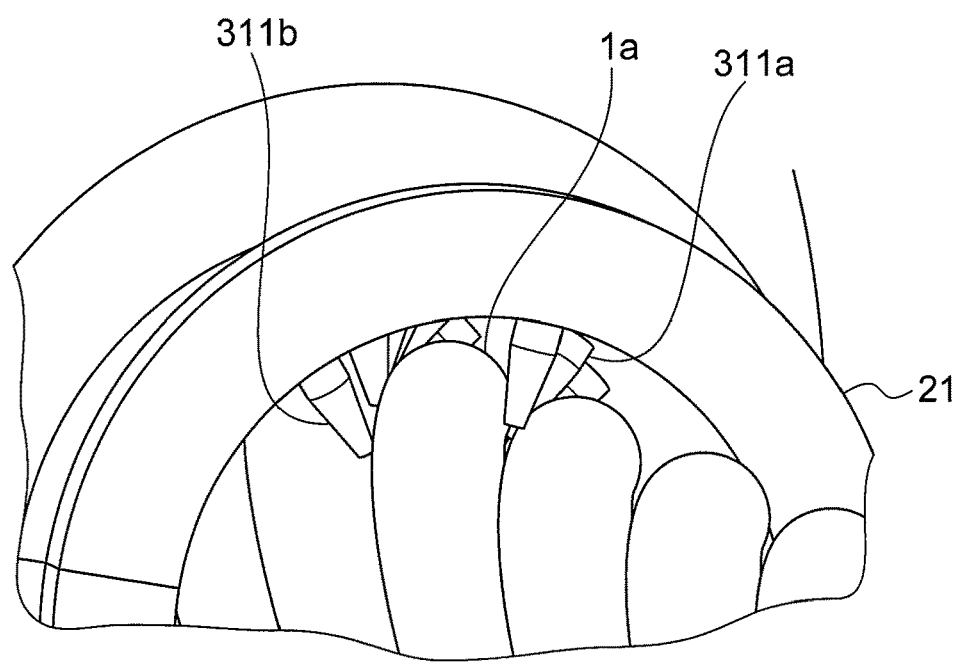
FIG. 12 is a perspective view showing a relationship between the wire rope and rope-engaging projecting portions of the rotating movable body for a wire rope shown in FIG. 9.

As shown in FIGS. 10 and 11, three rope-engaging projecting portions 311a for engaging with a single groove are provided in a row on the inner peripheral surface of the first case portion 21a serving as one part of the single case portion 21, which is divided into two parts in the direction of the rotary axis X. Further, three rope-engaging projecting portions 311b for engaging with a different single groove are provided in a row on the inner peripheral surface of the first case portion 21a. In other words, as shown in FIG. 12, the rope-engaging projecting portions 311a, 311b provided on the inner peripheral surface of the first case portion 21a are provided so as to sandwich one strand 1a among the eight strands 1a to 1h. Note that similarly arranged rope-engaging projecting portions 311a, 311b are also provided on the other part of the case portion 21 divided into two parts in the direction of the rotary axis X. Furthermore, similar arrangements of the rope-engaging projecting portions 311 are provided on the inner peripheral surfaces of the case portions 22, 23, 24.

When attaching the rotating movable body 300 for a wire rope to the wire rope 1, the rope-engaging projecting portions 311 are engaged with all of the grooves provided between the strands 1a to 1h. Further, the case portions 21, 22, 23, 24 are disposed so that the strands 1a to 1h are respectively sandwiched between the rope-engaging projecting portions 311a, 311b arranged in two rows. As a result, the strands 1a to 1h each remain in constant contact with the rope-engaging projecting portions 311 projecting inwardly from the case portions 21, 22, 23, 24.

Then, when the rotating movable body 300 for a wire rope is operated, the pulled portions 16 are pulled upward by a motor (not shown). Accordingly, the case portions 21, 22, 23, 24 move in the extension direction of the wire rope 1 while the pulled portions 16 are pulled, as indicated by an arrow A in FIG. 9, and the case portions 21, 22, 23, 24 rotate around the wire rope 1 so as to follow the twist of the strands 1a to 1h, as indicated by an arrow B in FIG. 9. If a deformation has occurred in the wire rope 1, the projecting portions 31 of the case portions 21, 22, 23, 24 catch on the deformed location of the wire rope 1. As a result, a deformation such as a kink in the wire rope 1 can be discovered easily.

Hence, in the rotating movable body 300 for a wire rope according to the third embodiment, the rope-engaging projecting portions 311 are provided on the inner peripheral surfaces of the case portions 21, 22, 23, 24 as the rope engaging portions. As a result, the rotating movable body 300 for a wire rope can be manufactured more easily than when a spiral-shaped irregularity is formed on the inner peripheral surface of a single tubular member. Moreover, the amount of processing labor is reduced, and therefore the manufacturing cost of the rotating movable body 300 for a wire rope can be suppressed. Furthermore, the rope engaging portion of the rotating movable body 300 for a wire rope is constituted by the plurality of rope-engaging projecting portions 311, and therefore a reduction in the weight of the rotating movable body 300 for a wire rope can be achieved. In addition, by using the rotating movable body 300 for a wire rope, the wire rope 1 can be inspected for deformations easily and at low cost.

Fourth Embodiment

Figure 13:
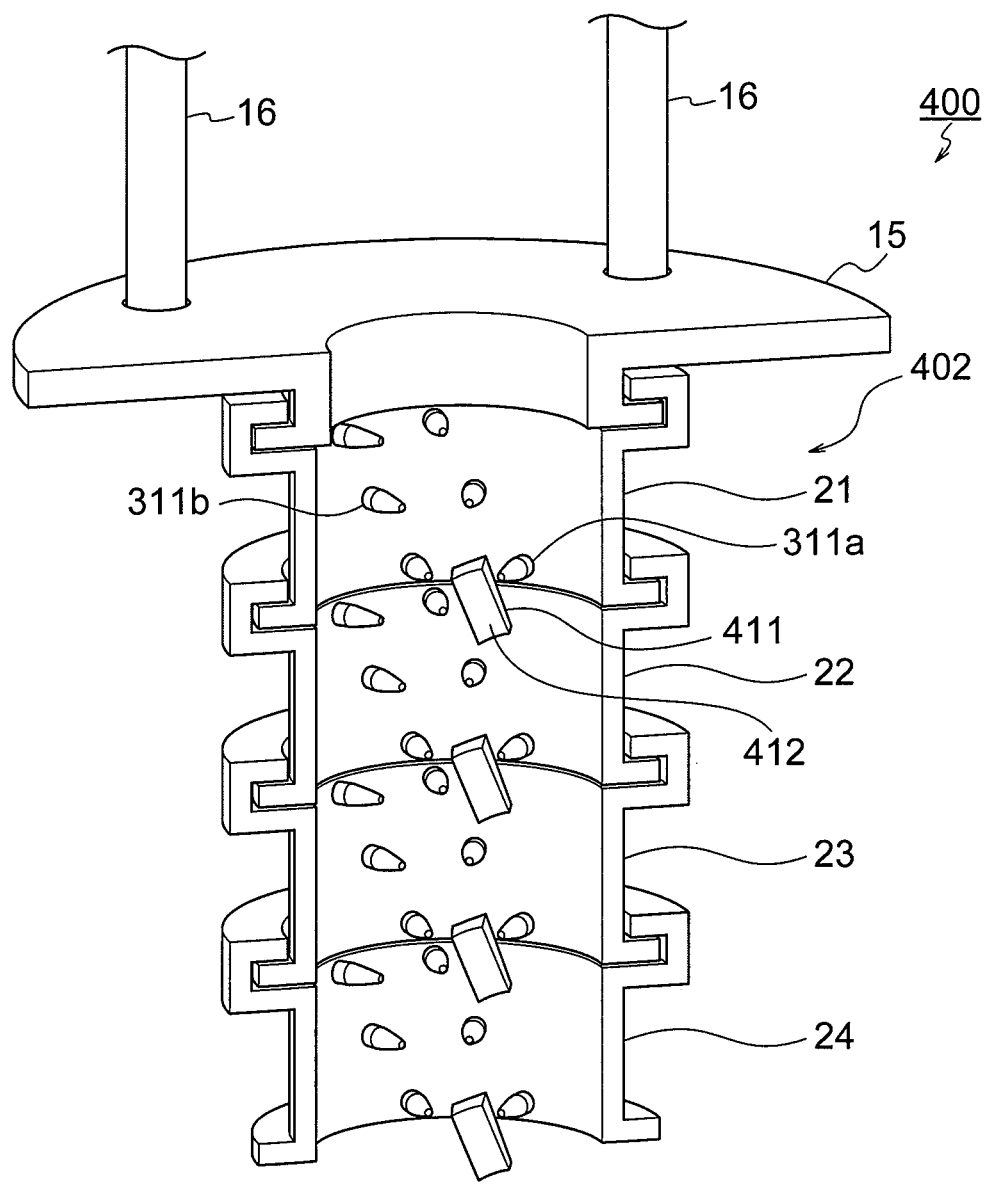
FIG. 13 is a perspective view showing an internal structure of a rotating movable body for a wire rope according to a fourth embodiment of this invention.
Figure 14:
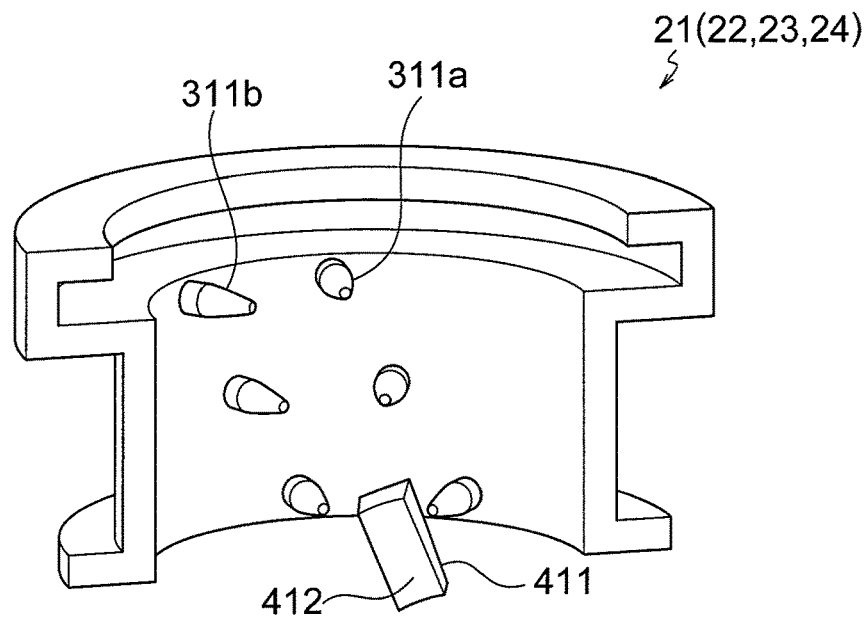
FIG. 14 is a perspective view showing a structure inside a case portion of the rotating movable body for a wire rope shown in FIG. 13.
Figure 15:
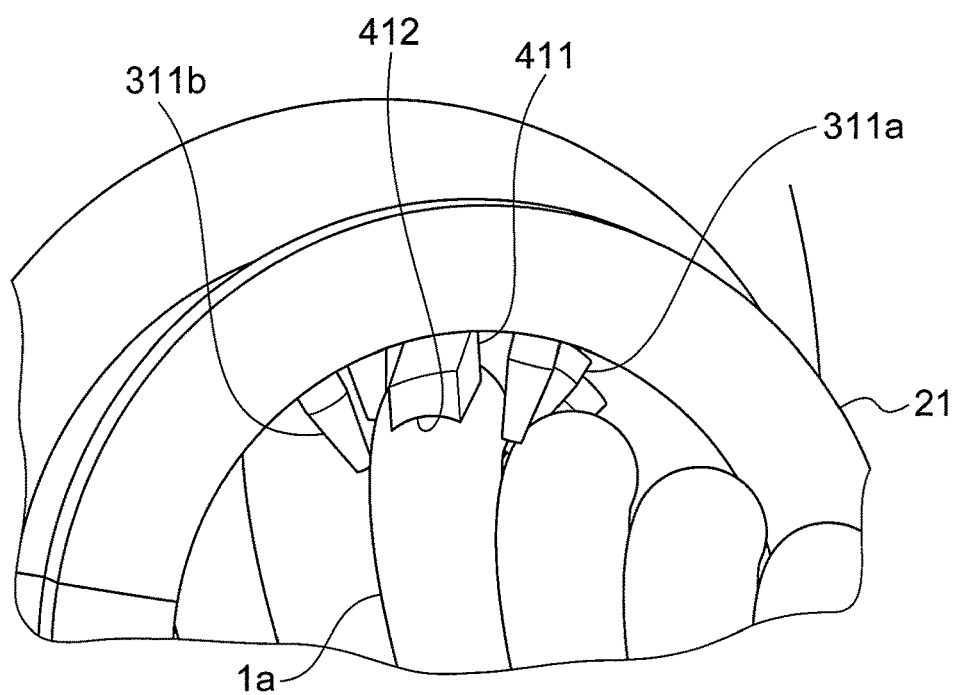
FIG. 15 is a perspective view showing a relationship between the wire rope and rope-engaging projecting portions and a strand contacting portion of the rotating movable body for a wire rope shown in FIG. 13.

FIGS. 13 to 15 show a configuration of a rotating movable body 400 for a wire rope according to a fourth embodiment of this invention. Note that identical symbols to the reference symbols in FIGS. 1 to 12 denote identical or similar constituent elements, and therefore detailed description thereof has been omitted.

As shown in FIGS. 13 and 14, a strand contacting portion 411 is provided between the row of rope-engaging projecting portions 311a and the other row of rope-engaging projecting portions 311b on a lower end of the inner peripheral surface of each of the case portions 21, 22, 23, 24, which form a rotating portion 402 of the rotating movable body 400 for a wire rope. The strand contacting portion 411 has a cylindrical surface 412. As shown in FIG. 15, the cylindrical surface 412 of the strand contacting portion 411 is shaped in alignment with the outer shape of each of the strands 1a to 1h of the wire rope 1 so as to contact the strands 1a to 1h by surface contact.

Hence, in the rotating movable body 400 for a wire rope according to the fourth embodiment, it is sufficient simply to provide the rope-engaging projecting portions 311 and the strand contacting portions 411 on the inner peripheral surfaces of the case portions 21, 22, 23, 24, and therefore the amount of processing labor can be reduced, enabling a reduction in the manufacturing cost of the rotating movable body 400 for a wire rope. The weight of the rotating movable body 400 for a wire rope can also be reduced. Furthermore, the strand contacting portions 411 are provided on the inner peripheral surfaces of the case portions 21, 22, 23, 24, and therefore the surface area by which the rotating movable body 400 for a wire rope comes into contact with the strands 1a to 1h of the wire rope 1 increases. As a result, deformations such as kinks can be detected at low cost more reliably.

Note that the strand contacting portions 411 are not limited to being used together with the rope-engaging projecting portions 311 and may also be provided on the inner peripheral surfaces of the case portions 21, 22, 23, 24 together with the rotary plates 214, 224, 234, 244 of the rotating movable body 200 for a wire rope according to the second embodiment.

Fifth Embodiment

FIGS. 16 to 19 show a configuration of a rotating movable body 500 for a wire rope according to a fifth embodiment of this invention. Note that identical symbols to the reference symbols in FIGS. 1 to 15 denote identical or similar constituent elements, and therefore detailed description thereof has been omitted.

Figure 16:
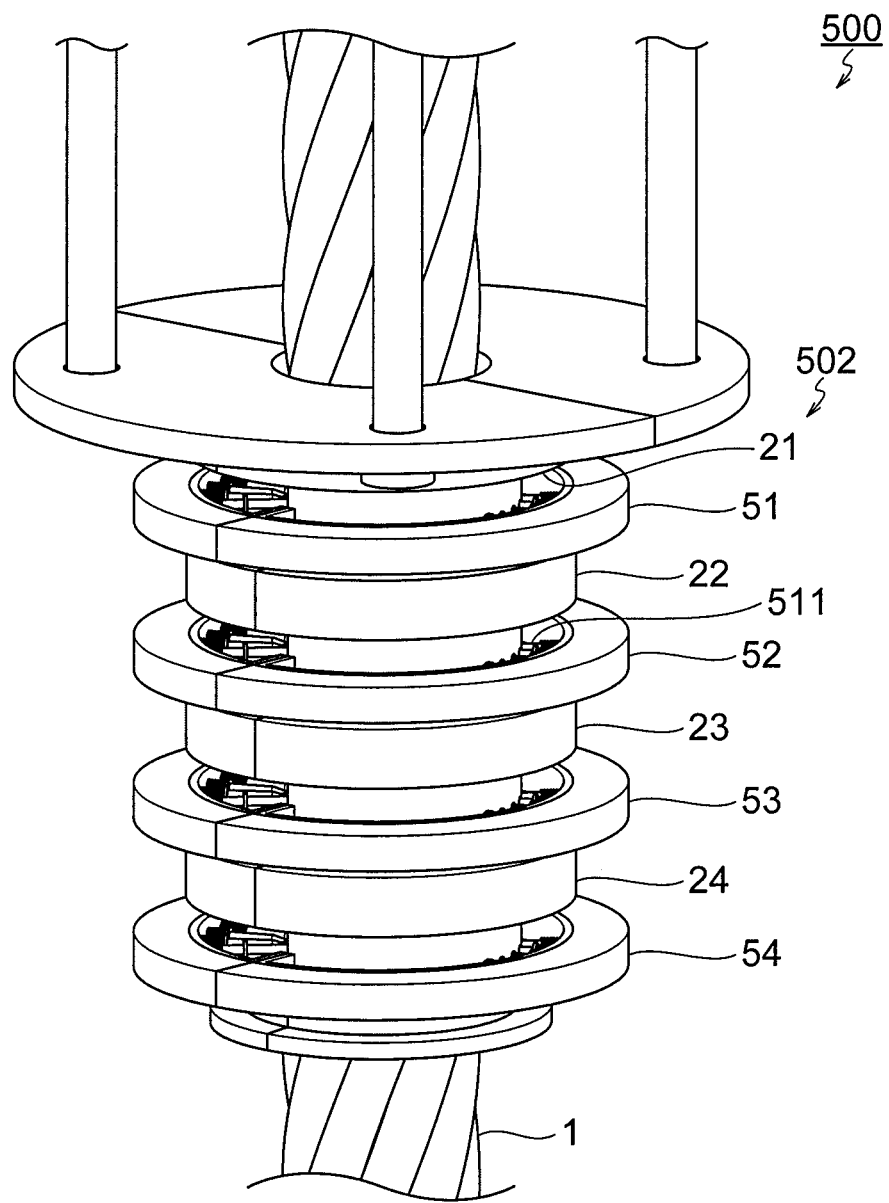
FIG. 16 is a perspective view showing a rotating movable body for a wire rope according to a fifth embodiment of this invention.
Figure 17:
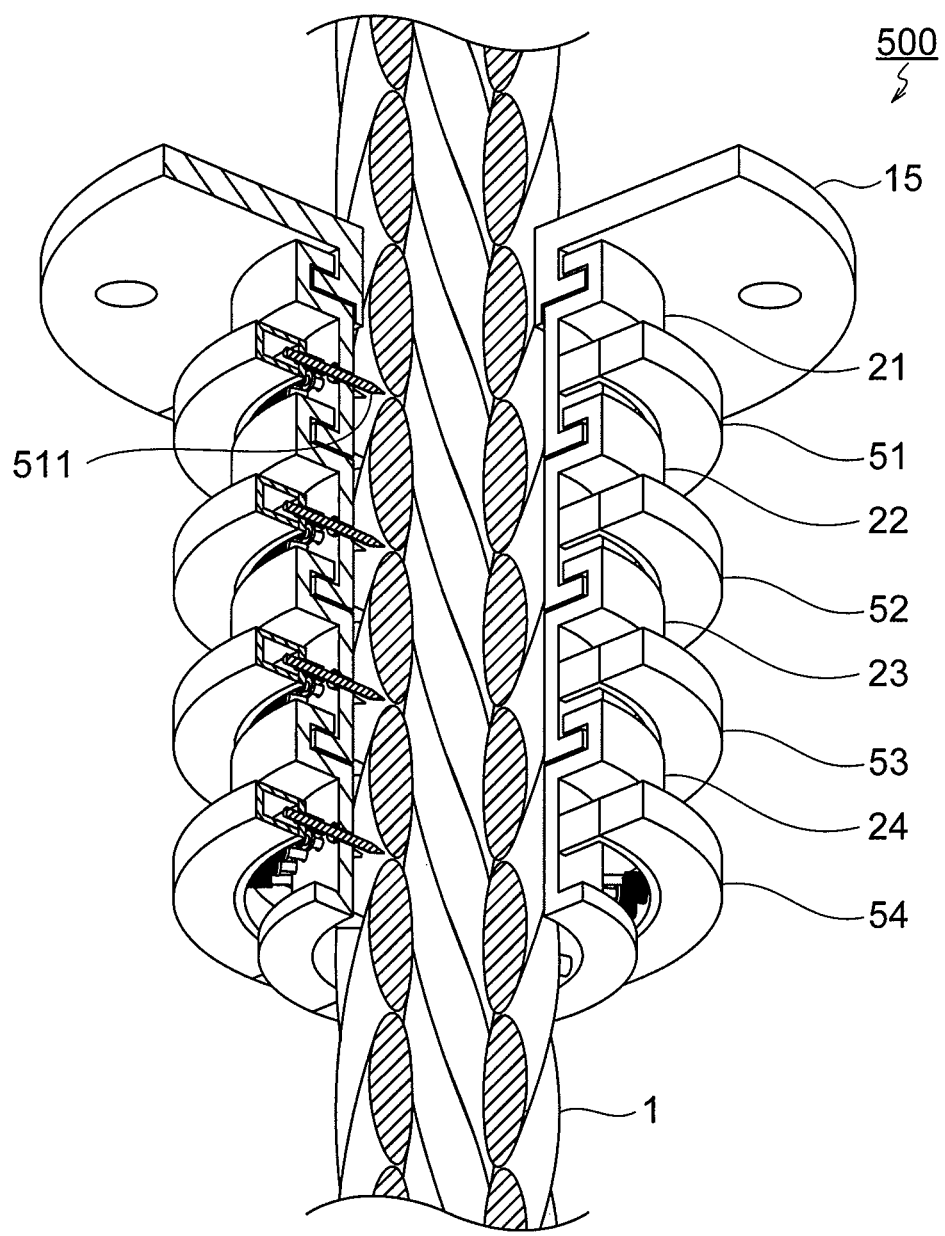
FIG. 17 is a partially cut-away perspective sectional view showing an internal structure of the rotating movable body for a wire rope shown in FIG. 16.
Figure 18:
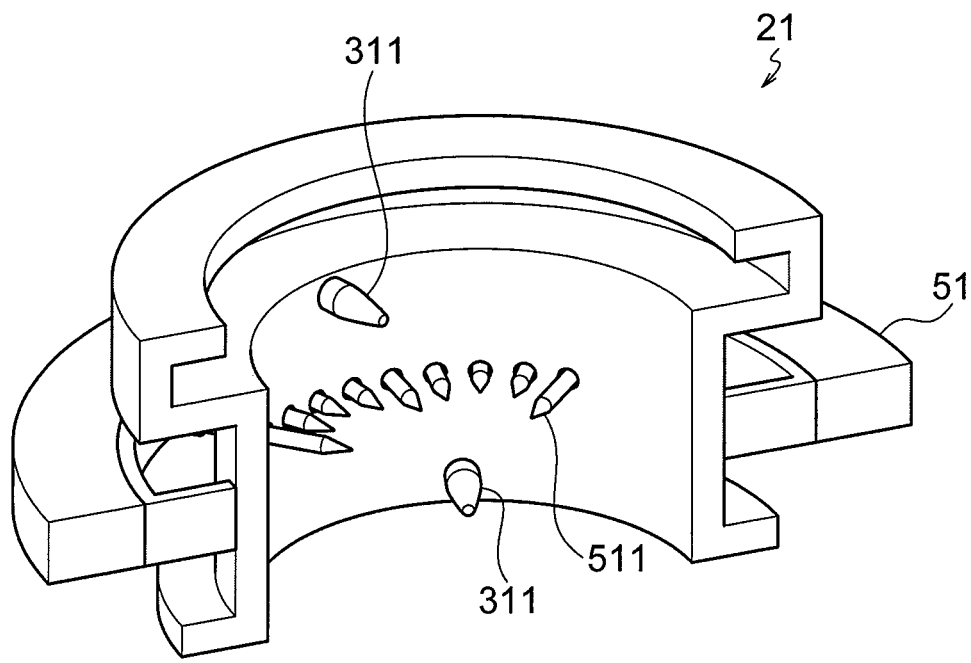
FIG. 18 is a perspective view showing a structure inside a case portion of the rotating movable body for a wire rope shown in FIG. 16.
Figure 19:
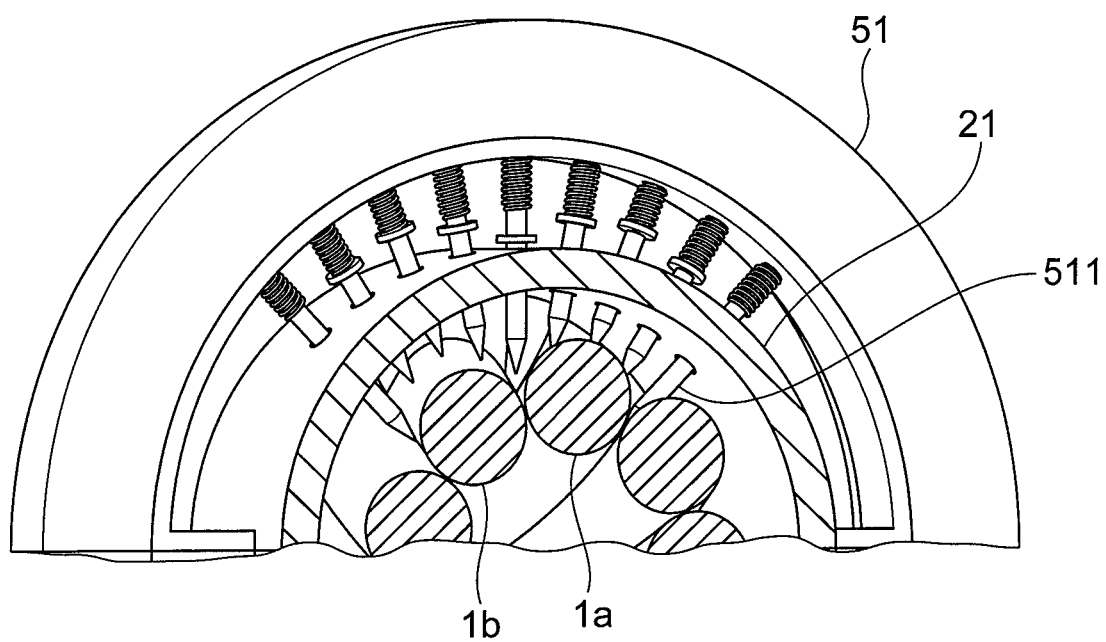
FIG. 19 is a perspective view showing a relationship between the wire rope and needle sensors of the rotating movable body for a wire rope shown in FIG. 16.

As shown in FIG. 16, annular portions 51, 52, 53, 54 are provided respectively on the outsides of the case portions 21, 22, 23, 24, which form a rotating portion 502 of the rotating movable body 500 for a wire rope. As shown in FIG. 17, the annular portions 51, 52, 53, 54 respectively include needle sensors 511 that project through the insides of the case portions 21, 22, 23, 24. As shown in FIG. 18, two rope-engaging projecting portions 311 that engage with the groove between two adjacent strands, among the eight strands 1a to 1h, are provided on the inner peripheral surface of the case portion 21. A plurality of needle sensors 511 are provided in a vertical direction between the two rope-engaging projecting portions 311. As shown in FIG. 19, the plurality of needle sensors 511 of the annular portion 51 are arranged in alignment with the outer shape of the two strands 1a, 1b forming the groove with which the rope-engaging projecting portions 311 engage. Thus, the tip ends of the needle sensors 551 of the respective annular portions 51, 52, 53, 54 each come into contact with two adjacent strands among the eight strands 1a to 1h of the wire rope 1.

The needle sensor 551 is capable of detecting variation in the surface shape of the wire rope 1. Therefore, when an irregularity such as a kink exists on the strands 1a to 1h of the wire rope 1, the position of the tip end of the needle sensor 511 shifts during the rotary motion of the rotating movable body 500 for a wire rope, and as a result, the existence of the deformation can be detected easily.

Hence, with the rotating movable body 500 for a wire rope according to the fifth embodiment, similarly to the rotating movable bodies 300, 400 for a wire rope, the amount of processing labor and the weight of the rotating movable body 500 for a wire rope can be reduced. Moreover, by using the rotating movable body 500 for a wire rope, the wire rope 1 can be inspected for deformations easily and at low cost. Furthermore, the needle sensors 551 are disposed on the insides of the case portions 21, 22, 23, 24 so that the tip ends of the needle sensors 511 come into contact with the strands 1a to 1h of the wire rope 1, and as a result, deformations can be detected more precisely.

Note that the needle sensors 511 are not limited to being used together with the rope-engaging projecting portions 311 and may also be provided on the insides of the case portions 21, 22, 23, 24 together with the rotary plates 214, 224, 234, 244 of the rotating movable body 200 for a wire rope according to the second embodiment.

Sixth Embodiment

FIGS. 20 to 23 show a configuration of a rotating movable body 600 for a wire rope according to a sixth embodiment of this invention.

Figure 20:
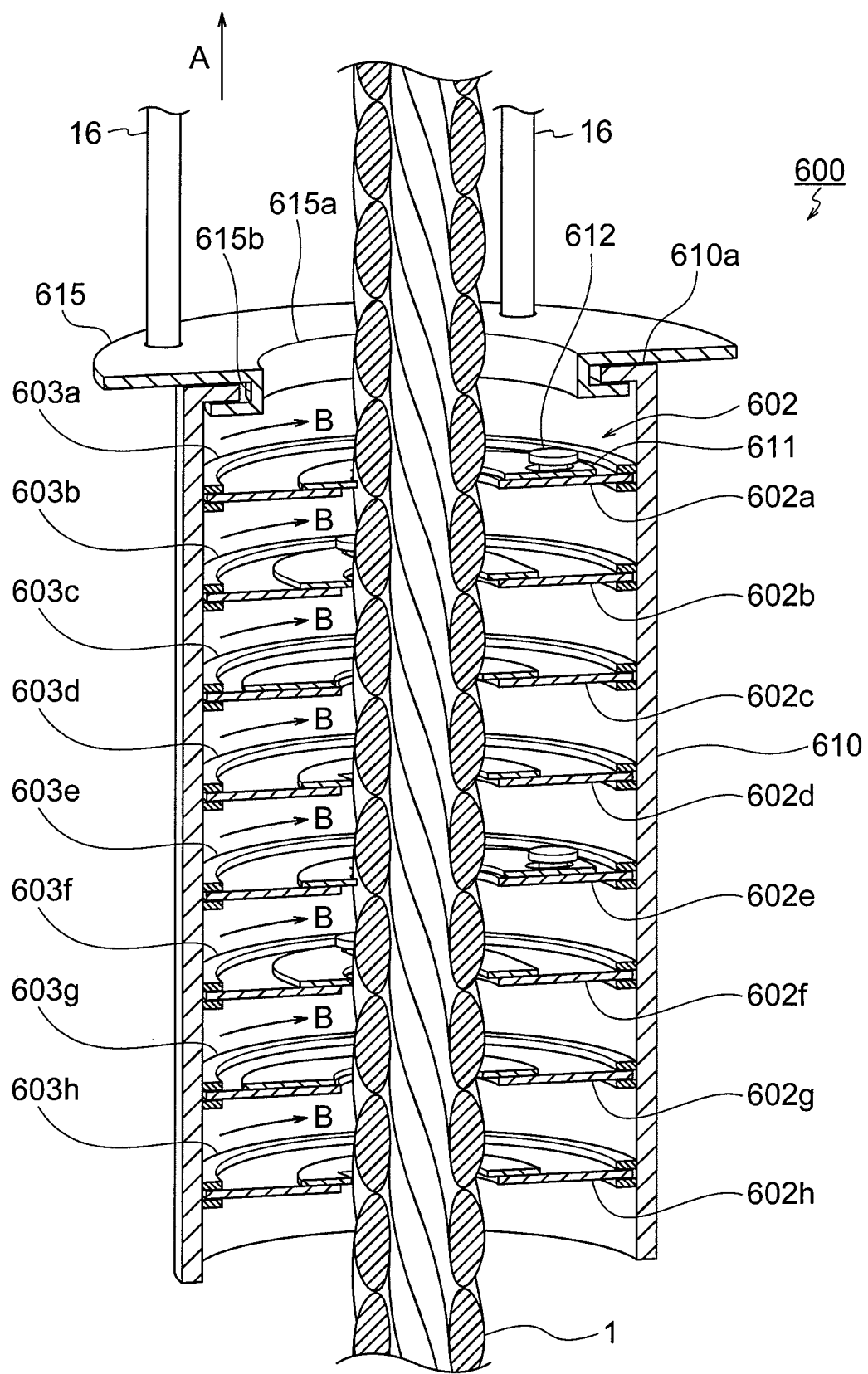
FIG. 20 is a perspective sectional view showing an internal structure of a rotating movable body for a wire rope according to a sixth embodiment of this invention.

As shown in FIG. 20, the rotating movable body 600 for a wire rope includes a substantially cylindrical rotating portion holding case 610. A substantially annular inward projecting portion 610a that projects inward is formed in an upper end of the rotating portion holding case 610. Further, eight substantially annular rotating portion holding rails 603a, 603b, 603c, 603d, 603e, 603f, 603g, 603h are provided at equal intervals in the extension direction of the wire rope 1 on the inner peripheral surface of the rotating portion holding case 610.

A connecting portion 615 is attached to the upper end of the rotating portion holding case 610. The connecting portion 615 is a plate-shaped member having a circular outer shape, and a rope hole 615a is formed in the center thereof. Further, an engaging groove portion 615b that is capable of engaging with the inward projecting portion 610a of the rotating portion holding case 610 is formed on a lower surface side of the connecting portion 615 so as to extend around the rope hole 615a.

Furthermore, disc plates 602a, 602b, 602c, 602d, 602e, 602f, 602g, 602h having a circular outer shape are respectively held rotatably by the rotating portion holding rails 603a, 603b, 603c, 603d, 603e, 603f, 603g, 603h provided on the inner peripheral surface of the rotating portion holding case 610.

Here, the disc plates 602a to 602h, which are arranged at predetermined intervals in the extension direction of the wire rope 1, together constitute a rotating portion 602 through the interior of which the wire rope 1 passes.

Figure 21:
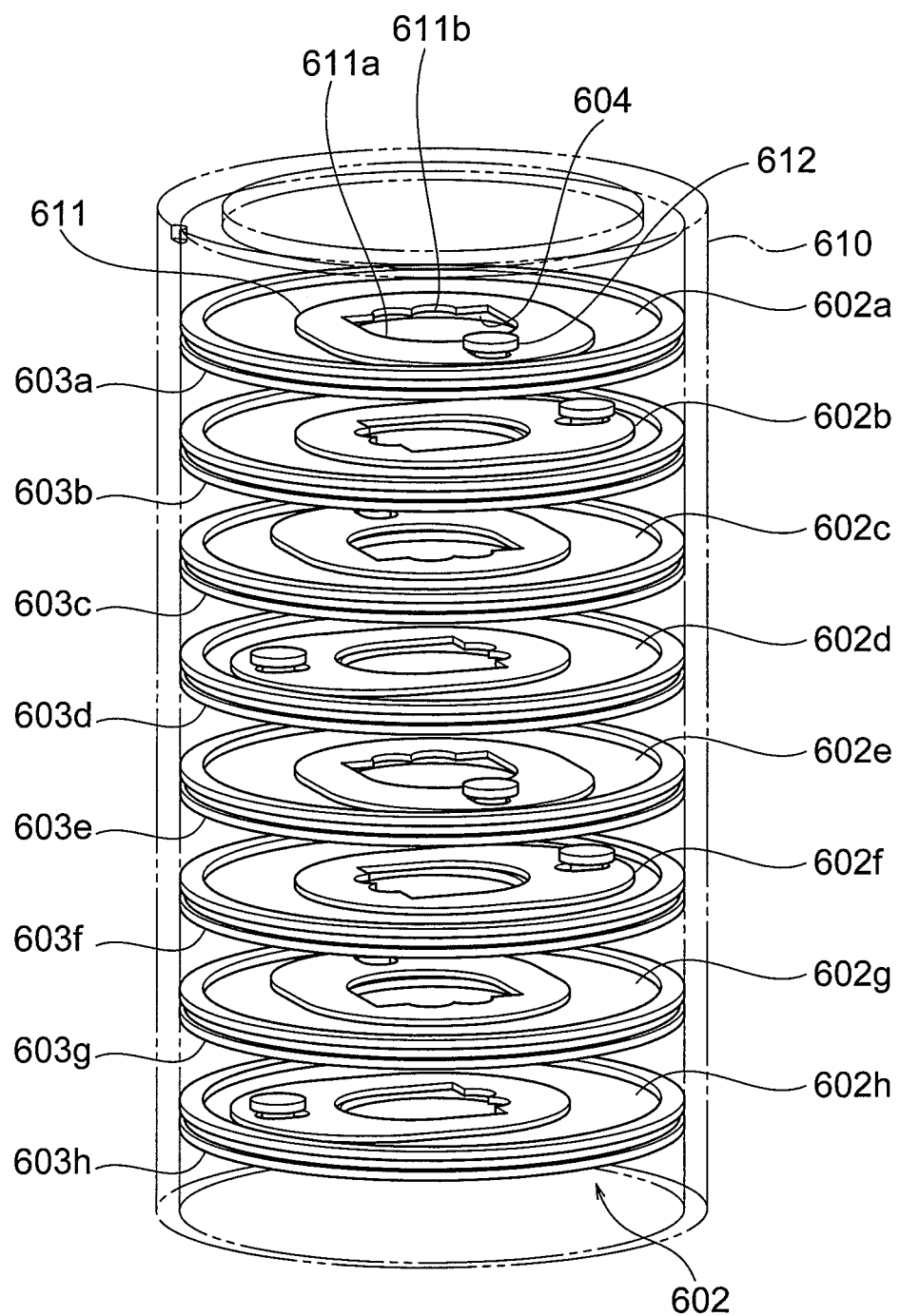
FIG. 21 is a schematic perspective view showing the internal structure of the rotating movable body for a wire rope shown in FIG. 20.
Figure 22:
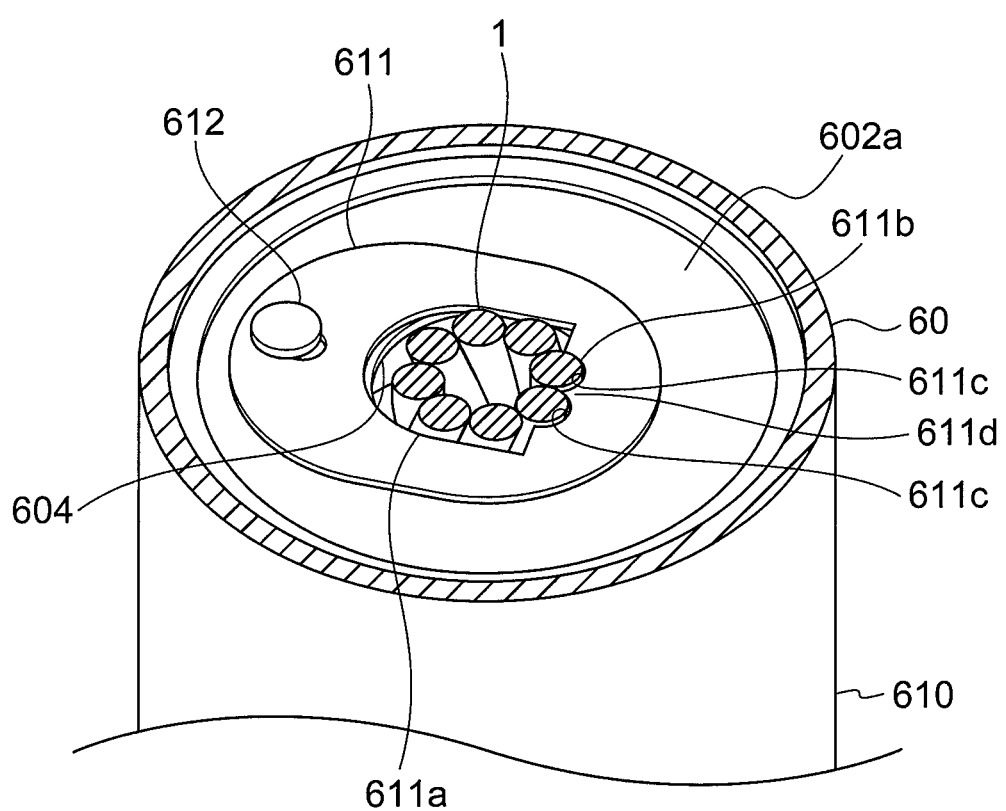
FIG. 22 is a partially enlarged perspective sectional view of the rotating movable body for a wire rope shown in FIG. 20.

As shown in FIGS. 21 and 22, a rope hole 604 through which the wire rope 1 passes is formed in the center of each of the disc plates 602a to 602h. Further, an engaging plate 611 is attached via a fixing member 612 to an upper surface of each of the disc plates 602a to 602h. A rope engaging hole 611a is formed in the engaging plate 611. The engaging plate 611 is disposed so that the position of the rope engaging hole 611a overlaps the rope hole 604 in the corresponding disc plate 602a to 602h. A rope-engaging recessed portion 611b capable of engaging with two of the eight strands 1a to 1h of the wire rope 1 is formed in the rope engaging hole 611a. The rope-engaging recessed portion 611b includes two semicircular portions 611c that correspond to the outer shapes of the two strands, and a projecting portion 611d between the two semicircular portions 611c engages with the groove between the strands of the wire rope 1.

Note that the engaging plates 611 constitute rope engaging portions.

Figure 23:
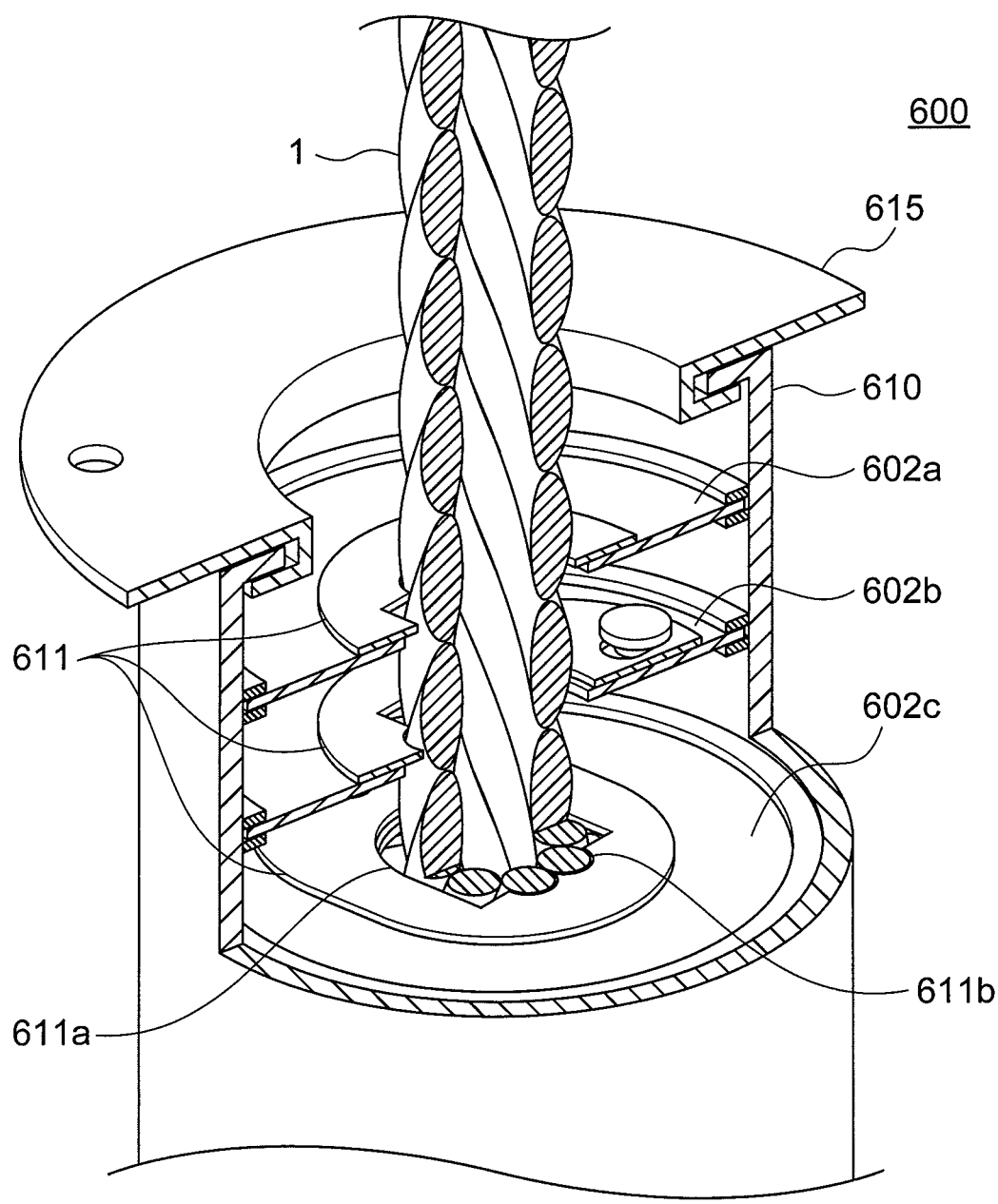
FIG. 23 is a partially cut-away perspective sectional view showing a relationship between a rotating portion of the rotating movable body for a wire rope and the wire rope shown in FIG. 20.

When attaching the rotating movable body 600 for a wire rope to the wire rope 1, as shown in FIG. 23, the disc plates 602a to 602h are arranged so that the rope-engaging recessed portions 611b of the respective engaging plates 611 engage with different combinations of two adjacent strands. As a result, each of the eight strands 1a to 1h comes into contact with the rope-engaging recessed portions 611b formed in two of the eight disc plates 602a to 602h.

Then, when the rotating movable body 600 for a wire rope is operated, the pulled portions 16 are pulled upward by a motor (not shown). Accordingly, the disc plates 602a to 602h move in the extension direction of the wire rope 1 while the pulled portions 16 are pulled, as indicated by an arrow A in FIG. 20, and the disc plates 602a to 602h rotate around the wire rope 1 so as to follow the twist of the strands 1a to 1h, as indicated by an arrow B in FIG. 20. If a deformation such as a kink has occurred in the wire rope 1, one of the disc plates 602a to 602h catches on the deformed location of the wire rope 1 such that the rotating movable body 600 for a wire rope becomes unable to move smoothly. As a result, the deformation in the wire rope 1 can be discovered easily.

Hence, in the rotating movable body 600 for a wire rope according to the sixth embodiment, the eight disc plates 602a to 602h are arranged at predetermined intervals in the extension direction of the wire rope 1. Accordingly, the engaging plates 611 provided respectively on the disc plates 602a to 602h as the rope engaging portions are also arranged at predetermined intervals in the extension direction of the wire rope 1. Further, the rope-engaging recessed portions 612b formed in the engaging plates 611 each engage with a part of the outer shape of the wire rope 1. Hence, the rotating movable body 600 for a wire rope, which is capable of performing a rotary motion around the wire rope 1, can be manufactured by processing the engaging plates 611 one at a time in alignment with parts of the outer shape of the wire rope 1. Therefore, the amount of processing labor required to manufacture the rotating movable body 600 for a wire rope is reduced, and as a result, the manufacturing cost of the rotating movable body 600 for a wire rope can be suppressed. Moreover, the rotating portion 602 of the rotating movable body 600 for a wire rope is constituted by the eight disc plates 602a to 602h, while the rope engaging portions are constituted by the eight engaging plates 611, and therefore a reduction in the weight of the rotating movable body 600 for a wire rope can be achieved. Furthermore, by using the rotating movable body 600 for a wire rope, deformations in the wire rope 1 can be detected easily and at low cost.

Further, the rotating portion 602 of the rotating movable body 600 for a wire rope includes the eight disc plates 602a to 602h corresponding to the eight grooves provided between the strands 1a to 1h of the wire rope 1. In other words, the engaging plates 611 provided on the disc plates 602a to 602h each include one rope-engaging recessed portion 611b. Moreover, the disc plates 602a to 602h are capable of rotating relative to and independently of each other. As a result, the rotating movable body 600 for a wire rope can be moved around the wire rope 1 without aligning the intervals between the disc plates 602a to 602h with the pitch of the strands 1a to 1h of the wire rope 1.

Note that in this embodiment, the rope-engaging recessed portions 611b are not limited to being formed in the engaging plates 611 and may be formed directly in the disc plates 602a to 602h. In this case, the disc plates 602a to 602h function as the rotating portion and the rope engaging portions.

Further, in the first to sixth embodiments, the rotating movable bodies 100, 200, 300, 400, 500, 600 for a wire rope are used as an inspection jig for detecting deformations such as kinks, but the rotating movable bodies 100, 200, 300, 400, 500, 600 for a wire rope are not limited thereto and may also be used to clean the wire rope 1, to remove cornices from a wire rope 1 installed outdoors, and so on.

Moreover, in the first to sixth embodiments, the rotating movable bodies 100, 200, 300, 400, 500, 600 for a wire rope are pulled upward by a motor via the pulled portions 16, but are not limited thereto. More specifically, the rotating movable bodies 100, 200, 300, 400, 500, 600 for a wire rope may be pulled up along the wire rope 1 by a mechanism such as a winch or a hydraulic actuator, for example. Furthermore, the rotating movable bodies 100, 200, 300, 400, 500, 600 for a wire rope may be pulled up by a mechanism that ascends and descends along the wire rope 1 while self-rotating or a mechanism that is fixed to the top of the wire rope 1. Further, the rotating movable bodies 100, 200, 300, 400, 500, 600 for a wire rope may move in a descending direction as well as the ascending direction indicated by the arrow A.

Moreover, a small camera may be disposed on an upper portion or a lower portion of the rotating movable bodies 100, 200, 300, 400, 500, 600 for a wire rope so that the location of the deformation can be visually confirmed. In addition, the small camera may be provided with an LED, and a power supply of the LED may be configured to be capable of using power generated by the rotation of the rotating movable bodies 100, 200, 300, 400, 500, 600 for a wire rope.

REFERENCE SIGNS LIST 100, 200, 300, 400, 500, 600 Rotating movable body for a wire rope
1 Wire rope
1a, 1b, 1c, 1d, 1e, 1f, 1g, 1h Strand
2, 202, 302, 402, 502, 602 Rotating portion
11, 12, 13, 14, 214, 224, 234, 244 Rotary plate (rope engaging portion)
21, 22, 23, 24 Case portion
111, 121, 131, 141, 214a Rope passing hole 112a, 112b, 122a, 122b, 132a, 132b, 142a, 142b, 214b, 611b Rope-engaging recessed portion
311 Rope-engaging projecting portion (rope engaging portion)
411 Strand contacting portion
511 Needle sensor
611 Engaging plate (rope engaging portion)

The invention claimed is:

1. A rotating movable body for a wire rope comprising:
a rotating portion through the interior of which a wire rope passes, the wire rope being formed by twisting together a plurality of strands; and
at least two rope engaging portions provided on the rotating portion so as to engage with parts of an outer shape of the wire rope, wherein
the at least two rope engaging portions are arranged at a predetermined interval in an extension direction of the wire rope, and
in a state where each of the plurality of strands is in contact with one of the at least two rope engaging portions, the rotating portion moves in the extension direction of the wire rope and rotates so as to follow the twist of the strands,
wherein the rotating portion includes at least two tubular case portions that are arranged in the extension direction of the wire rope and capable of rotating relative to each other, and
the rope engaging portions are provided on the insides of the respective case portions.

2. The rotating movable body for a wire rope of claim 1, wherein the rope engaging portions include rotary plates respectively formed with rope passing holes through which the wire rope passes,
at least one rope-engaging recessed portion is formed in the rope passing holes, and
the rope-engaging recessed portion engages with two adjacent strands among the plurality of strands of the wire rope.

3. The rotating movable body for a wire rope of claim 2, wherein two rope-engaging recessed portions are formed in the rope passing hole in the rotary plates.

4. The rotating movable body for a wire rope of claim 1, wherein the rope engaging portions include rope-engaging projecting portions that project inwardly from the rotating portion, and
the rope-engaging projecting portions engage with a groove between two adjacent strands among the plurality of strands of the wire rope.

5. The rotating movable body for a wire rope of claim 1, wherein a strand contacting portion that comes into contact with the strands of the wire rope by surface contact is provided on the inside of the rotating portion.

6. The rotating movable body for a wire rope of claim 1, wherein a needle sensor that comes into contact with the strands of the wire rope and detects variation in a surface shape of the wire rope is provided on the rotating portion.

7. The rotating movable body for a wire rope of claim 1, wherein the rope engaging portions are formed of elastic bodies.

8. A rotating movable body for a wire rope, comprising:
a rotating portion through the interior of which a wire rope passes, the wire rope being formed by twisting together a plurality of strands; and
at least two rope engaging portions provided on the rotating portion so as to engage with parts of an outer shape of the wire rope, wherein
the at least two rope engaging portions are arranged at a predetermined interval in an extension direction of the wire rope, and
in a state where each of the plurality of strands is in contact with one of the at least two rope engaging portions, the rotating portion moves in the extension direction of the wire rope and rotates so as to follow the twist of the strands,
wherein the rope engaging portions include rotary plates respectively formed with rope passing holes through which the wire rope passes,
at least one rope-engaging recessed portion is formed in the rope passing holes, and
the rope-engaging recessed portion engages with two adjacent strands among the plurality of strands of the wire rope, and
wherein a needle sensor that comes into contact with the strands of the wire rope and detects variation in a surface shape of the wire rope is provided on the rotating portion.

9. The rotating movable body for a wire rope of claim 8, wherein two rope-engaging recessed portions are formed in the rope passing hole in the rotary plates.

10. The rotating movable body for a wire rope of claim 8, wherein the rope engaging portions include rope-engaging projecting portions that project inwardly from the rotating portion, and
the rope-engaging projecting portions engage with a groove between two adjacent strands among the plurality of strands of the wire rope.

11. The rotating movable body for a wire rope of claim 8, wherein a strand contacting portion that comes into contact with the strands of the wire rope by surface contact is provided on the inside of the rotating portion.

12. The rotating movable body for a wire rope of claim 8, wherein the rotating portion includes at least two tubular case portions that are arranged in the extension direction of the wire rope and capable of rotating relative to each other, and
the rope engaging portions are provided on the insides of the respective case portions.

13. The rotating movable body for a wire rope of claim 8, wherein the rope engaging portions are formed of elastic bodies.

* * * * *